(12) United States Patent
Chong et al.

(10) Patent No.: US 9,357,235 B2
(45) Date of Patent: May 31, 2016

(54) SAMPLE ADAPTIVE OFFSET MERGED WITH ADAPTIVE LOOP FILTER IN VIDEO CODING

(71) Applicant: Qualcomm Incorporated, San Diego, CA (US)

(72) Inventors: In Suk Chong, San Diego, CA (US); Sanjeev Kumar, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 817 days.

(21) Appl. No.: 13/648,367

(22) Filed: Oct. 10, 2012

(65) Prior Publication Data

US 2013/0094569 A1    Apr. 18, 2013

Related U.S. Application Data

(60) Provisional application No. 61/546,925, filed on Oct. 13, 2011.

(51) Int. Cl.
*H04N 19/86* (2014.01)
*H04N 19/176* (2014.01)
*H04N 19/117* (2014.01)
*H04N 19/14* (2014.01)
*H04N 19/82* (2014.01)

(52) U.S. Cl.
CPC ............ *H04N 19/86* (2014.11); *H04N 19/117* (2014.11); *H04N 19/14* (2014.11); *H04N 19/176* (2014.11); *H04N 19/82* (2014.11)

(58) Field of Classification Search
None
See application file for complete search history.

(56) References Cited

U.S. PATENT DOCUMENTS

| 4,692,806 | A | * | 9/1987 | Anderson et al. | ........ | 375/240.08 |
|---|---|---|---|---|---|---|
| 2005/0025249 | A1 | * | 2/2005 | Zhao et al. | ............... | 375/240.24 |
| 2011/0026600 | A1 | | 2/2011 | Kenji | | |
| 2011/0235711 | A1 | | 9/2011 | Kondo et al. | | |
| 2011/0274158 | A1 | * | 11/2011 | Fu | .................... | H04N 19/00006 375/240.02 |
| 2011/0305274 | A1 | * | 12/2011 | Fu et al. | ................... | 375/240.02 |
| 2012/0177107 | A1 | * | 7/2012 | Fu et al. | ................... | 375/240.03 |

(Continued)

FOREIGN PATENT DOCUMENTS

| JP | 2003244702 A | 8/2003 |
|---|---|---|
| JP | 2005073245 A | 3/2005 |

(Continued)

OTHER PUBLICATIONS

Saywood (Introduction to Data Compression, 3rd edition; Publisher Elsevier, 2005; ISBN 0080509258, 9780080509259).*

(Continued)

*Primary Examiner* — William C Vaughn, Jr.
*Assistant Examiner* — Stuart Bennett
(74) *Attorney, Agent, or Firm* — Shumaker & Sieffert, P.A.

(57) ABSTRACT

Techniques for performing sample adaptive offset (SAO) and adaptive loop filter (ALF) processes in a video coding process are described. The SAO and ALF processes may be combined. In one example, the determination of offset values for a SAO filter process may be based on classifications used in an ALF process. In one example, an ALF classification that indicates a particular directional characteristic of a video block may be used to determine how and whether an SAO filter process is applied to each sample within the video block.

40 Claims, 12 Drawing Sheets

(56) References Cited

U.S. PATENT DOCUMENTS

2013/0022103 A1* 1/2013 Budagavi ............... 375/240.02
2013/0051455 A1* 2/2013 Sze ................... H04N 19/70
                                                  375/240.02

FOREIGN PATENT DOCUMENTS

JP      2008022404 A    1/2008
WO      2011105231 A1   9/2011

OTHER PUBLICATIONS

McCann et al.,"HM3: High Efficiency Video Coding (HEVC) Test Model 3 Encoder Description," JCT-VC E602, 5th Meeting: Geneva, CH, Mar. 16-23, 2011, 35 pp.

Chen et al., "CE8 Subtest2: A Joint Proposal on Improving the Adaptive Loop Filter in TMuC0.9 by MediaTek, Qualcomm, and Toshiba," JCTVC-D119, 4th Meeting: Daegu, KR, Jan. 20-28, 2011, 18 pp.

Fu et al., "CE13: Sample Adaptive Offset with LCU-Independent Decoding," JCTVC-E049, 5th Meeting: Geneva, CH, Mar. 16-23, 2011, 6 pp.

International Search Report and Written Opinion—PCT/US2012/059761—ISA/EPO—Dec. 5, 2012, 13 pp.

Minezawa et al.,"Removing DC component of ALF filter coefficients," JCTVC-G445, Nov. 8, 2011, 3 pp.

U.S. Appl. No. 13/627,457, by In Suk Chong, filed Sep. 26, 2012.

Yoo et al., "Enhanced Adaptive Loop Filter for Motion Compensated Frame," IEEE Transactions on Image Processing, vol. 20, No. 8, pp. 2177-2188, Aug. 2011.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Fu et al., "Sample Adaptive Offset for HEVC," Mediatek Inc., 2011 IEEE 13th International Workshop on Multimedia Signal Processing, 5 pages.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/059761, dated Sep. 9, 2013, 28 pp.

International Preliminary Report on Patentability from International Application No. PCT/US2012/059761, dated Jan. 24, 2014, 7 pp.

Fu et al., "Sample Adaptive Offset with PPS-Level Syntax," Joint Collaborative Team on Video Coding (JCT-VC) of ITU-T SG16 WP3 and ISP/IEC JTC1/SC29/WG11, 6th Meeting: Torino, IT, Jul. 14-22, 2011, Document: JCTVC-F058, 5 pp.

Ikai et al., "CE8.2: Region-based adaptive loop filter using two-dimensional feature," Joint Collaborative Team on Video Coding (JCT-VC) of TU-T SG16 WP3 and ISO/IEC JTC1/SC29/WG11, 5th Meeting: Geneva, Switzerland, Mar. 16-23, 2011, JCTVC-E141, 7 pp.

* cited by examiner

SAO_EO_0
(0 degrees)

SAO_EO_1
(90 degrees)

SAO_EO_2
(135 degrees)

SAO_EO_3
(45 degrees)

FIG. 1

SAO_EO_4

SAO_EO_5

| 0 | 1 | 4 | 5 |
|---|---|---|---|
| 15 | 2 | 3 | 6 |
| 14 | 11 | 10 | 7 |
| 13 | 12 | 9 | 8 |

SAMPLE ADAPTIVE OFFSET MERGED WITH ADAPTIVE LOOP FILTER IN VIDEO CODING

RELATED APPLICATIONS

This application claims the benefit of:

U.S. Provisional Application No. 61/546,925, filed Oct. 13, 2011, which is hereby incorporated by reference in its entirety.

TECHNICAL FIELD

This disclosure relates to video coding, and more particularly to techniques for performing sample adaptive offset and adaptive loop filter processes in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, digital cameras, digital recording devices, digital media players, video gaming devices, video game consoles, cellular or satellite radio telephones, so-called "smart phones," video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for performing sample adaptive offset (SAO) and adaptive loop filter (ALF) processes in a video coding process. The adaptive loop filter may be merged with the SAO determination of offset values such that the SAO offset values are based at least in part on a value associated with the AC coefficients of the adaptive loop filter.

According to one example of the disclosure, a method of filtering video data comprises receiving a block of video data, wherein the block of video data includes a plurality of sample values, determining one or more filter coefficients for the block of video data, determining a respective offset value for each of the plurality of sample values based at least in part on a value associated with the one or more filter coefficients, and filtering the block of video data based on the determined one or more filter coefficient and the determined respective offset values.

According to another example of the disclosure an apparatus configured to filter video data comprises means for receiving a block of video data, wherein the block of video data includes a plurality of sample values, means for determining one or more filter coefficients for the block of video data, means for determining a respective offset value for each of the plurality of sample values based at least in part on a value associated with the one or more filter coefficients, and means for filtering the block of video data based on the determined one or more filter coefficient and the determined respective offset values.

According to another example of the disclosure a device comprises a video coder configured to receive a block of video data, wherein the block of video data includes a plurality of sample values, determine one or more filter coefficients for the block of video data, determine a respective offset value for each of the plurality of sample values based at least in part on a value associated with the one or more filter coefficients, and filter the block of video data based on the determined one or more filter coefficient and the determined respective offset values.

According to another example of the disclosure a non-transitory computer-readable storage medium has instructions stored thereon that upon execution cause one or more processors of a video coding device to receive a block of video data, wherein the block of video data includes a plurality of sample values, determine one or more filter coefficients for the block of video data, determine a respective offset value for each of the plurality of sample values based at least in part on a value associated with the one or more filter coefficients, and filter the block of video data based on the determined one or more filter coefficient and the determined respective offset values The details of one or more examples are set forth in the accompanying drawings and the description below. Other features, objects, and advantages will be apparent from the description and drawings, and from the claims.

BRIEF DESCRIPTION OF DRAWINGS

FIG. 1 is a conceptual diagram showing four possible edge offset classifications for SAO filtering.

DETAILED DESCRIPTION

Figure 2:
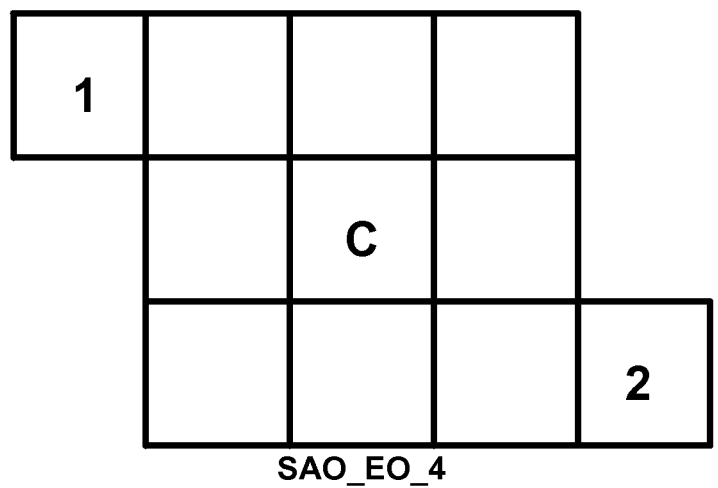
FIG. 2 is a conceptual diagram showing two possible edge offset classifications for SAO filtering.
Figure 2:
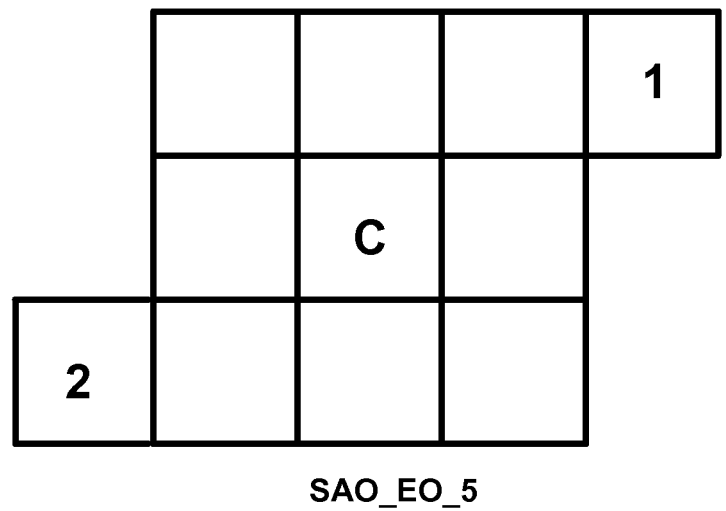

In general, this disclosure describes techniques for coding video data. This disclosure describes techniques for performing sample adaptive offset and adaptive loop filter processes in a video coding process. In some case, the DC coefficient offsets in ALF may be redundant because SAO already uses DC offsets. Further, because SAO is typically performed before applying an ALF, additional encoder frame delay may be created. In view of this, this disclosure proposes to several techniques for combining SAO filtering techniques with ALF filtering techniques.

Digital video devices implement video compression techniques to encode and decode digital video information more efficiently. Video compression techniques may be defined according to a video coding standard. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG).

HEVC standardization efforts are based on a model of a video coding device referred to as the HEVC Test Model (HM). The HM presumes improvements in the capabilities of current video coding devices with respect to video coding devices available during the development of other previous video coding standards, e.g., ITU-T H.264/AVC, were developed. For example, whereas H.264 provides nine intra-prediction encoding modes, HEVC provides as many as thirty-five intra-prediction encoding modes. A recent working Draft (WD) of HEVC, referred to as "HEVC Working Draft 4" or "WD4," is described in document JCTVC-F803_d2, Bross et al., "WD4: Working Draft 4 of High-Efficiency Video Coding (HEVC)," Joint Collaborative Team on Video Coding (JCT-VC) of ITU-T SG16 WP3 and ISO/IEC JTC1/SC29/WG11, 6th Meeting: Torino, IT, July, 2011. Further, another recent working draft of HEVC, Working Draft 8, is described in document HCTVC-J1003_d7, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, SE, Jul. 11-20, 2012. The HEVC standard may also be referred to as ISO/IEC 23008-HEVC, which is intended to be the standard number for the delivered version of HEVC.

A typical video encoder operating according to a video coding standard, such as HEVC WD4, partitions each frame of the original video sequence into contiguous rectangular regions called "blocks" or "coding units." These blocks may be encoded by applying spatial (intra-frame) prediction and/or temporal (inter-frame) prediction techniques to reduce or remove redundancy inherent in video sequences. A spatial prediction may be referred to as an "intra mode" (I-mode), and a temporal prediction may be referred to as an "inter mode" (P-mode or B-mode).

For inter mode, the encoder first searches a "reference frame" (denoted by $F_{ref}$) for a block that is similar to the one to be coded. The location of the block to be coded within the frame may be denoted by (x, y). Searches are generally restricted to being no more than a certain spatial displacement from the block to be encoded. When the best match, i.e., predictive block or "prediction," has been identified, it may be expressed in the form of a two-dimensional (2D) motion vector $(\Delta y, \Delta y)$, where $\Delta x$ is the horizontal displacement and $\Delta y$ is the vertical displacement of the position of the predictive block in the reference frame relative to the position of the block to be coded. The motion vectors together with the reference frame are used to construct predicted block $F_{pred}$ as follows:

$$F_{pred}(x,y)=F_{ref}(x+\Delta x, y+\Delta y)$$

For blocks encoded in intra mode, the predicted block is formed using spatial prediction from previously encoded neighboring blocks within the same frame as the block to be coded.

For both I-mode and P- or B-mode, the prediction error, i.e., the difference between the pixel values in the block being encoded and the predicted block, may represented as a set of weighted basis functions of some discrete transform, such as a discrete cosine transform (DCT). Transforms may be performed based on different sizes of blocks, such as 4×4, 8×8 or 16×16 and larger. Rectangular shaped transform blocks may also be used, e.g., with a transform block size of 16×4, 32×8, etc. The weights (i.e., the transform coefficients) may subsequently be quantized. Quantized coefficients may have a lower precision than the original transform coefficients. As such, quantization may introduce a loss of information. A quantization parameter (QP) may determine the level of precision of the quantized coefficients.

These quantized coefficients and syntax elements, such as motion vector, plus some control information, may form a coded representation of the video sequence. Further, quantized coefficients, syntax elements and control information may also be entropy coded, thereby further reducing the number of bits needed for their representation. Entropy coding is a lossless operation aimed at minimizing the number of bits required to represent transmitted or stored symbols based on a probability distribution (i.e., coding symbols based the frequency that they occur). The compression ratio, i.e., the ratio of the number of bits used to represent the original sequence versus the number of bits used to represent the coded video sequence, may be controlled by adjusting the value of the QP used when quantizing transform coefficients. However, adjusting the value QP may affect the visual quality of the coded video sequence. The compression ratio may also depend on the method of entropy coding employed. At a decoder, a block in a current frame to be decoded may be reconstructed by adding a prediction error to an identified predictive block. Due to information losses in the coding process, in some cases, the reconstructed frame may be different from the original frame. The difference between the reconstructed frame and the original frame is called reconstruction error.

For video coding according to HEVC, as one example, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. The two chroma components may also be denoted by $C_b$ and $C_r$. A video sampling format may define the number of chroma samples with respect to the number of luma samples. In some video sampling formats, the number of chroma samples may be the same as or different from the number of luma samples. A CU is typically square, and may be considered to be similar to a so-called "macroblock" described in other video coding standards such as, for example, ITU-T H.264. Coding according to some of the presently proposed aspects of the developing HEVC standard will be described in this application for purposes of illustration. However, the techniques described in this disclosure may also be useful for and applied to other video coding processes, such as those defined according to ITU-T H.264 or other standard or proprietary video coding processes.

According to the HEVC, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, an LCU may be split into sub-CUs, and each sub-CU may be further split into sub-CUs. Further, CUs may be partitioned into prediction PUs for purposes of prediction. A PU may represent all or a portion of the corresponding CU, and may include data for retrieving a reference sample for the PU. PUs may have square or rectangular shapes. TUs represent a set of pixel difference values or pixel residuals that may be transformed to produce transform coefficients. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU. In general, "portion" may refer to any sub-set of a video frame.

Further, HEVC WD4 describes a sample adaptive offset (SAO) coding technique. Additional SAO coding techniques have been proposed for possible inclusion in the HEVC standard. One example SAO coding technique is described in C.-M. Fu, C.-Y. Chen, C.-Y. Tsai, Y.-W. Huang, S. Lei, "CE13: Sample Adaptive Offset with LCU-Independent Decoding," JCT-VC Contribution, E049, Geneva, March 2011 (hereinafter "JCT-VC E049"). In general, SAO coding techniques are filtering techniques that add offset values to pixels in a video frame. In some cases offset values may be added to pixels in a reconstructed video frames. The reconstructed frame with offset values may further be used as a reference video frame and/or output to a display. SAO techniques may be executed in the "in-loop" filter block of a video encoder or decoder in conjunction with other filtering techniques As described above, predictive coding may result in a reconstruction error. The addition of offset values to pixels in a reconstructed video frame may improve coding during illumination changes between frames of a video sequence (e.g., such as during flashes, a darkening sky, or other types of illumination changes between frames). Such illumination changes may add a relatively uniform intensity change across regions of pixels in the frame. SAO techniques may apply offset values to pixels of a predicted video block in order to bias the values of the predictive video block so as to compensate for illumination changes or other video coding conditions that improve through the use of SAO techniques. SAO techniques may determine and apply offset values to a pixel by classifying a pixel according to a classification metric. A classification metric may also be referred to as pixel classification or an offset type. Further, the result of classifying a pixel according to a classification metric may also be referred to as an offset type, pixel offset type, category or pixel category. Possible classification metrics include activity metrics such as edge metrics and band metrics.

Some SAO techniques include multiple pixel classifications techniques. Some video coding standards may limit the number of different pixel classifications that may be applied per frame (e.g., one technique per frame), while others may allow for more flexibility by allowing different pixel classifications to be applied on a block-by-block or pixel-by-pixel basis. It should be noted that the number of pixel classification types that are allowed to be applied, and the frequency at which different pixel classifications are allowed to be applied in a video frame may affect coding efficiency.

HEVC WD4 describes a possible SAO implementation for HEVC where each partition (which consists of a set of LCUs) can have one of three pixel classifications: no offset, edge classification based type, and band classification based offset type. Further, the edge classification based type includes four edge offset classifications: 1D 0-degree edge (also referred to as SAO edge offset of classification zero or SAO_EO_0), 1D 90-degree edge (also referred to as SAO edge offset of classification one or SAO_EO_1), 1D 135-degree edge (also referred to as SAO edge offset of classification two or SAO_EO_2), and 1D 45-degree edge (also referred to as SAO edge offset of classification three or SAO_EO_3). Band classification based offset type includes two band offset type classifications: central band and side band.

An edge classification based type SAO technique classifies each pixel within a partition based on edge information. FIG. 1 is a conceptual diagram showing four possible edge offset classifications. JCT-VC E049 describes one example of an edge classification technique that includes the four edge offset type classifications described above. For a given edge classification shown in FIG. 1, an edge type for the current pixel is calculated by comparing the value of the current pixel (C) to the values of neighboring pixels (1 and 2). In some examples, pixel values may be an 8-bit string including 256 possible values or a 10-bit string including 1024 possible values. For SAO_EO_0, the current pixel is compared to the left and right neighbor pixels. For SAO_EO_1, the current pixel is compared to the top and bottom neighbor pixels. For SAO_EO_2, the current pixel is compared to the upper left and bottom right neighbor pixels. For SAO_EO_3, the current pixel is compared to the bottom left and upper right neighbor pixels.

Initially, the edge type of the current pixel is assumed to be zero. If the value of current pixel C is equal to values of both the left and right neighbor pixels (1 and 2), the edge type remains at zero. If the value of the current pixel C is greater than the value of neighbor pixel 1, the edge type is increased by one. If the value of the current pixel C is less than the value of neighbor pixel 1, the edge type is decreased by one. Likewise, if the value of the current pixel C is greater than the value of neighbor pixel 2, the edge type is increased by one, and if the value of the current pixel C is less than the value of the neighbor pixel 2, the edge type is decreased by 1.

As such, the current pixel C may have an edge type of either −2, −1, 0, 1, or 2, where (1) the edge type is −2 if the value of current pixel C is less than both values of neighbor pixels 1 and 2; (2) the edge type is −1 if the value of current pixel C is less than one neighbor pixel, but equal to the other neighbor pixel; (3) the edge type is 0 if the value of current pixel C is the same as both neighbor pixels, or if the value of current pixel C is greater than one neighbor pixel, but less than the other neighbor pixel; (4) the edge type is 1 if the value of the current pixel C is greater than one neighbor pixel, but equal to the other neighbor pixel; and (5) the edge type is 2 if the value of the current pixel C is greater than both values of neighbor pixels 1 and 2. It should be noted that when one of neighboring pixels 1 and 2 is not available (i.e., current pixel C is located at the edge of a frame or partition), a default edge type may be defined.

In view of the above description, for each edge offset classification, edge type values may be computed with the following equations:

EdgeType=0;

if (C>Pixel 1)EdgeType=EdgeType+1;

if (C<Pixel 1)EdgeType=EdgeType−1;

if (C>Pixel 2)EdgeType=EdgeType+1;

if (C<Pixel 2)EdgeType=EdgeType−1;

Once an edge type is determined for a current pixel an offset value can be determined for the current pixel. Offset values are based on the difference between the original video frame and the reconstructed video frame. In one example, each non-zero edge type value (i.e., −2, −1, 1, and 2) has one offset value calculated by taking an average of differences between the values of original and reconstructed pixels belonging to each category in a partition. The four offset values may be denoted as $eoffset_{-2}$, $eoffset_{-1}$, $eoffset_1$, and $eoffset_2$. Because each of $eoffset_{-2}$, $eoffset_{-1}$, $eoffset_1$, and $eoffset_2$ is based on the original video frame, which is not available at a video decoder, a video decoder includes a mechanism to derive the four offset values without relying of the original video frame.

In addition to the four offset classifications illustrate in FIG. 1, additional edge offset classifications may be used in conjunction with or as an alternative to the edge offset classifications illustrated in FIG. 1. FIG. 2 illustrates two additional offset classifications that may be used in addition to or as an alternative to the offset classifications illustrated in FIG. 1. The additional offset classifications illustrated in FIG. 2 may be respectively referred to as 1D greater than 135 degree edge (SAO_EO_4) and 1D less than 45 degree edge (SAO_EO_5). Thus, any combination of the edge offset classifications illustrated in FIG. 1 and FIG. 2 may be used for edge offset filtering. As described in greater detail below, the combinations of edge offset classification may be used with a band classification based offset type. For each edge offset classification illustrated in FIG. 2, edge type values may be computed according to the equations provided above with respect to the edge offset classifications illustrated in FIG. 1.

Figure 3:
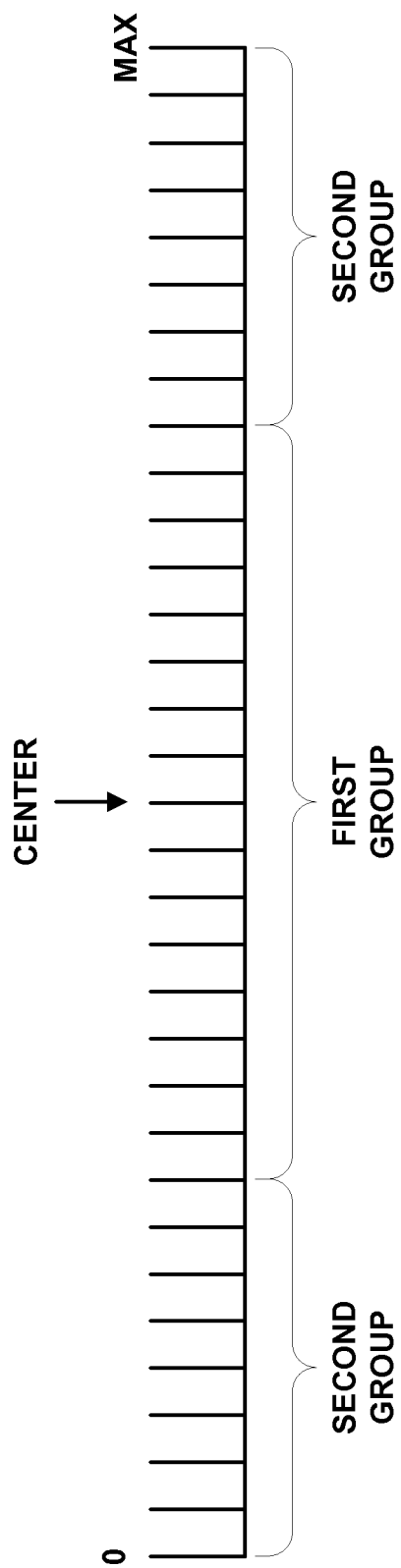
FIG. 3 is a conceptual diagram showing example band offset types for SAO filtering.

Band classification based offset type classifies pixels into different bands based on their intensity. As described above, band classification based offset type may include two band offset type classifications: central band and side band. FIG. 3 is a conceptual diagram showing an example band classification based offset type including a central band and a side band. As shown in FIG. 3 each of pixel intensities 0 to MAX may be categorized into one of 32 bands. In one example, pixels may have 8-bit intensity values and MAX may equal 255. In the example of FIG. 3, the 16 bands in the center are classified into a first group and the remaining side bands are classified into a second group. In a manner similar to edge type band offset, once a band type is determined for a current pixel, an offset value can be determined for the current pixel based on the difference between the original video frame and the reconstructed video frame. In one example, each band type value (i.e., 0 to 31) has one offset value calculated by taking an average of differences between the values of original and reconstructed pixels belonging to each band type category in a partition. Thus, for each group of bands (i.e., first group and second group), 16 offset values are determined. The 16 offset values for each group may be denoted $boffset_0, \ldots, boffset_{15}$. As with $eoffset_{-2}$, $eoffset_{-1}$, $eoffset_1$, and $eoffset_2$, each of $boffset_0, \ldots, boffset_{15}$ is based on the original video frame and a video decoder includes a mechanism to derive the 16 offset values. Typically, an encoded video bitstream includes information indicating one of the six pixel classification types and a corresponding set of offsets (i.e., $eoffset_{-2}, \ldots, eoffset_2$ and $boffset_0, \ldots, boffset_{15}$) for each partition of a video frame. In some examples, each offset value in a set offset values is independently coded and signaled in a bitstream using signed unary coding on a partition-by-partition basis. In other examples, offset values may be predicted by a video decoder using other offset values in the bitstream. For example, a video decoder may predict the value of $eoffset_{-2}$ from $eoffset_2$. In this manner, the number of bits required to signal a set of offset values may be reduced. Examples of signaling offset values are described in co-pending U.S. patent application Ser. No. 13/627,457, filed Sep. 26, 2012, which is hereby incorporated by reference.

Further, as described above, SAO techniques may be executed in conjunction with additional filtering techniques. Additional filtering techniques may include, for example, Weiner filtering techniques. Similar to the calculation of offset values for SAO techniques, additional filtering techniques may calculate filter coefficients based on the difference between the original frame and the reconstructed frame. For example, filter coefficients for a Weiner filter may be determined based on the difference between the original picture and a reconstructed picture. Like offset values, calculated coefficients may also be included in the bitstream for use by a video decoder.

Figures 4, 5:
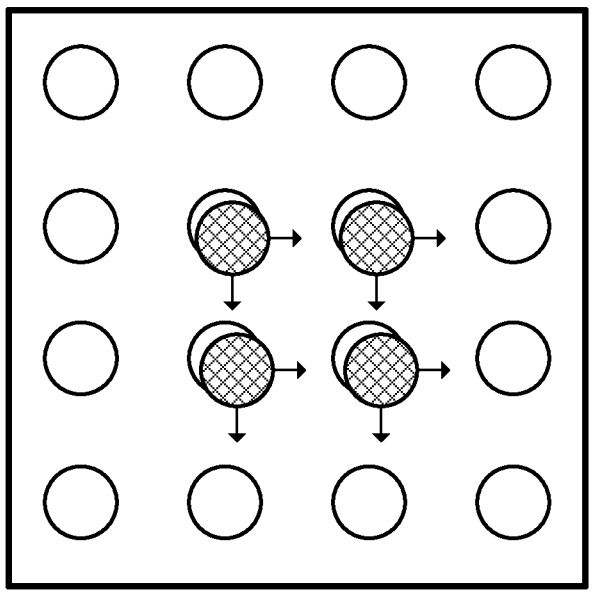
FIG. 4 is a conceptual diagram showing region-based classification for an adaptive loop filter.
FIG. 5 is a conceptual diagram showing block-based classification for an adaptive loop filter.

Other proposals for HEVC describe an adaptive loop filter (ALF) process. In one example ALF process, two adaptation modes (i.e., block and region adaptation) are proposed. For region-based adaptive mode, a frame is divided into 16 regions, and each region may have one set of linear filter coefficients (AC coefficients and one DC coefficient) and one region can share the same filter coefficients with other regions. FIG. 4 is a conceptual diagram showing a region-based classification for an adaptive loop filter. As illustrated in FIG. 4, a frame is divided into 16 regions, where each region is indexed according to an index value, i.e., 0, . . . , 15. As illustrated in FIG. 4, indexes are assigned to regions of the frame according to the illustrated pattern. In other examples, index values may be assigned to regions of the frame based on other patterns, e.g., raster scan, zigzag, etc. In some examples, index values 0, . . . , 15 may be associated with an order that an operation is performed on a region.

FIG. 5 is a conceptual diagram showing a block-based classification for an adaptive loop filter. In one example block-based mode, each 4×4 block derives a class by computing a metric using direction and activity information. Direction, activity and a corresponding class may be computed according to the following equations. In the following equations, (i,j) denotes the location of a pixel according to a horizontal and vertical coordinate.

Direction $$Ver(i,j)=abs(X(i,j)<<1-X(i,j-1)-X(i,j+1))$$

$$Hor(i,j)=abs(X(i,j)<<1-X(i,j-1)-X(i,j+1))$$

$$H_B=\Sigma_{i=1,2}\Sigma_{j=1,2}Hor(i,j)$$

$$V_B=\Sigma_{i=1,2}\Sigma_{j=1,2}Ver(i,j)$$

$$Direction=0,1(H_B>2V),2(V_B>2H)$$

Activity $$L_B=H_B+V_B$$

$$Activity=0,1,2,3,4$$

Metric

Activity+5*Direction 15 classes(0,1, . . . ,14,15)

For each class (i.e., 0, 1, . . . , 14, 15), one set of linear filter coefficients (AC coefficients and one DC coefficient) can be used. Further, in one example a class may be allowed to share a filter coefficient with other classes.

Thus, in region-based classification each region may have one set of AC and DC filter coefficients. Likewise, in block-based classification each block may have one set of AC and DC filter coefficients. Further, in an example ALF process a filtered pixel value is derived by taking a summation of adjusted values of current and neighboring pixels within a partition of a video block, wherein the values of current and neighboring pixels are adjusted by multiplying calculated AC coefficients and adding DC coefficients to the current and neighboring pixels. In this manner, the AC coefficient may be described as a multiplier or weight. The value of the summation may further be normalized by dividing the result of the summation by the total number pixels included in partition. The equation below provides an example equation for calculating a filtered pixel using AC and DC coefficients, wherein the pixel is included in partition of size 1 by m and bit_shift is a normalizing factor:

Filtered pixel(x,y)=(sum$_{1,m}$(prefiltered pixel(x+1,y+m)*AC coefficients(1,m))+ DC coefficients)>>bit_shift.

Because the SAO process adds an offset value to pixels, in some cases, the addition of DC coefficients to SAO filtered pixels may be redundant. Further, because SAO is typically performed before applying the ALF, additional encoder frame delay may be created by applying DC coefficients/offsets in each filtering process. In view of the following, this disclosure proposes techniques for merging SAO filtering techniques with region and block based filtering techniques (e.g., ALF) that utilize AC and DC coefficients.

Figure 6:
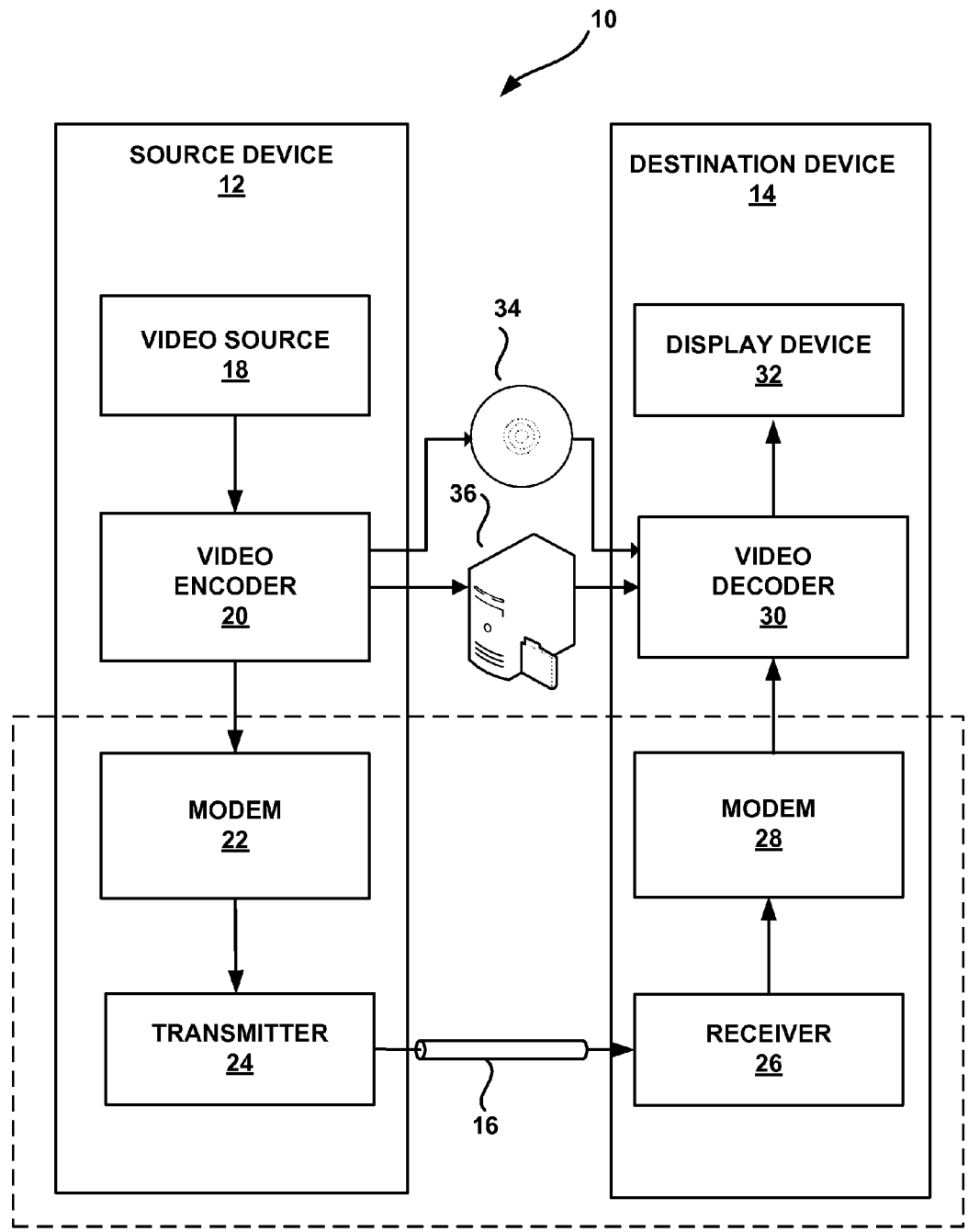
FIG. 6 is a block diagram illustrating an example video encoding and decoding system.

FIG. 6 is a block diagram illustrating an example video encoding and decoding system 10 that may be configured to utilize techniques for filtering video using a combination of ALF and SAO techniques. As shown in FIG. 6, system 10 includes source device 12 and destination device 14. Source device 12 may be configured to transmit encoded video to destination device 14 via a communication channel 16 or to file server 36 which may be accessed by the destination device 14 as desired. Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wired and/or wireless communication. Hence, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from the source device 12 to the destination device 14.

Similarly, file server 36 may be accessed by source device 12 and destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on file server 36. File server 36 may be any type of server capable of storing encoded video and transmitting encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both.

Source device 12 may also be configured to store encoded video data on storage medium 34. Storage medium 34 may include Blu-ray discs, DVDs, CD-ROMs, flash memory, or any other suitable digital storage media for storing encoded video. When encoded video data is stored to storage medium 34 or file server 36, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Techniques for filtering video data using a combination of ALF and SAO techniques, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 6, source device 12 includes video source 18, video encoder 20, modulator/demodulator 22 and transmitter 24. Video source 18 may include a source such as a video capture device, such as a video camera, a video archive containing previously captured video, a video feed interface to receive video from a video content provider, and/or a computer graphics system for generating computer graphics data as the source video, or a combination of such sources. In one example, if video source 18 is a video camera, source device 12 and destination device 14 may form socalled camera phones or video phones. However, the techniques described in this disclosure may be applicable to video coding in general, and may be applied to wireless and/or wired applications, or application in which encoded video data is stored on a local disk. Video encoder 20 may encode the captured, pre-captured, or computer-generated video. Encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas. Video encoder 20 may store encoded video information onto a storage medium 34 or a file server 36 for later consumption. The encoded video stored on the storage medium 34 may then be accessed by the destination device 14 for decoding and playback.

The destination device 14, in the example of FIG. 6, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

The video encoder 20 and the video decoder 30 may operate according to a video compression standard, such as HEVC and may conform to the HM. Alternatively, the video encoder 20 and the video decoder 30 may operate according to other proprietary or industry standards, such as the ITU-T H.264 standard, or extensions of such standards. The techniques of this disclosure, however, are not limited to any particular coding standard.

Although not shown in FIG. 6, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for coding and signaling sample adaptive offset values and filter coefficients in a video encoding process. Likewise, the video decoder 30 may implement reciprocal versions of any or all of these techniques for coding sample adaptive offset values and AC coefficients for an ALF in a video coding process. A video coder, as described in this disclosure, may refer to a video encoder or a video decoder. Similarly, a video coding unit may refer to a video encoder or a video decoder. Likewise, video coding may refer to video encoding or video decoding. In this manner, video encoder 20 and video decoder 30 represent examples of video coders configured to determine one or more filter coefficients for a block of video data and determine a respective offset value for each of the plurality of sample values based at least in part on the one or more filter coefficients.

Figure 7:
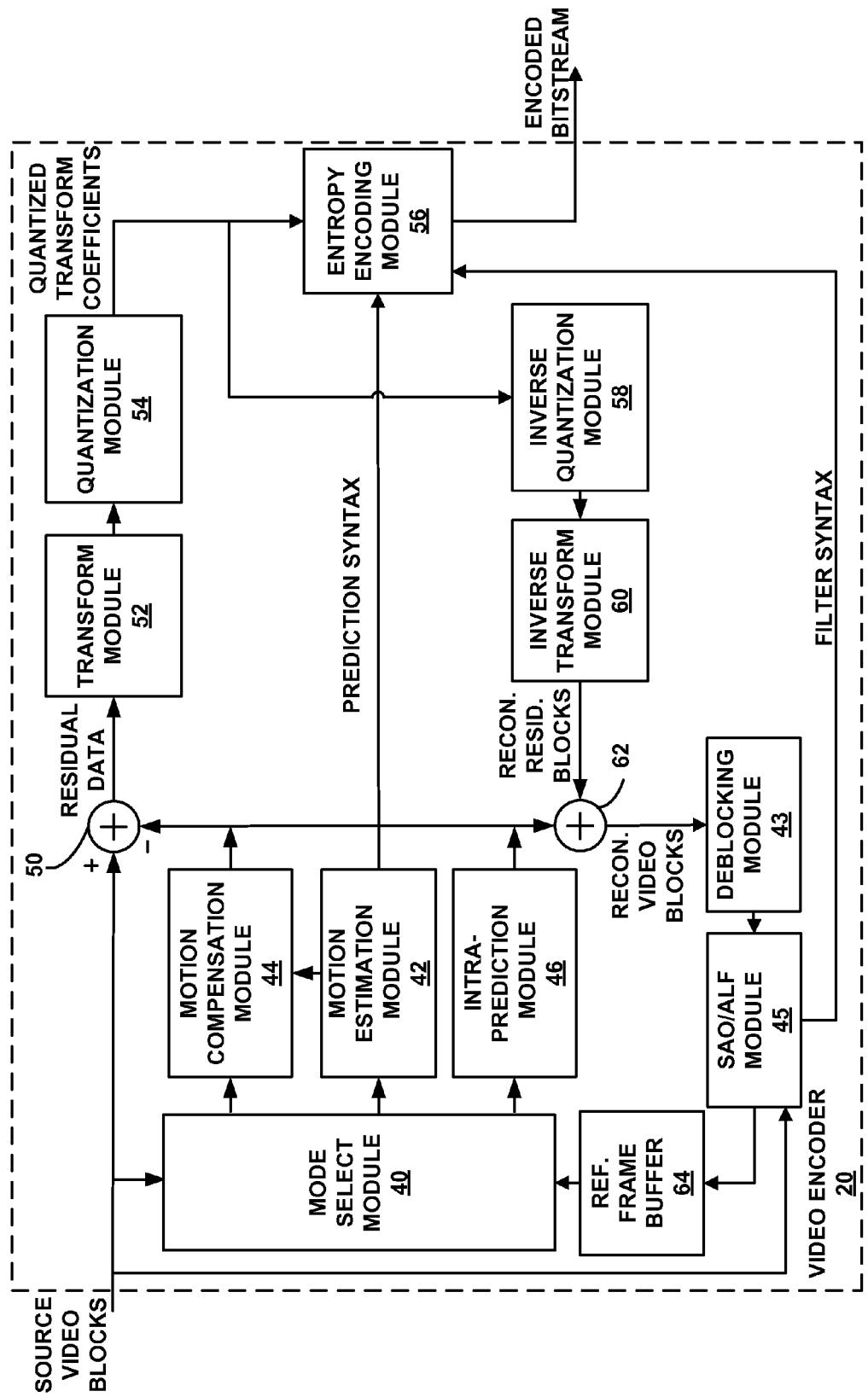
FIG. 7 is a block diagram illustrating an example video encoder.

FIG. 7 is a block diagram illustrating an example of a video encoder 20 that may be configured to use techniques for filtering video data using a combination of ALF and SAO techniques as described in this disclosure. Video encoder 20 will be described in the context of HEVC coding for purposes of illustration, but the techniques described herein may be equally applicable to other video coding standards. Video encoder 20 may perform intra- and inter-coding of CUs within video frames. As described above, intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 7, the video encoder 20 receives source video blocks within a video frame to be encoded. In the example of FIG. 7, the video encoder 20 includes mode select module 40, motion estimation module 42, motion compensation module 44, intra-prediction module 46, a reference frame buffer 64, a summer 50, a transform module 52, a quantization module 54, and an entropy encoding module 56. Video encoder 20 also includes an inverse quantization module 58, an inverse transform module 60, a summer 62, deblocking module 43, and an SAO/ALF module 45 for video block reconstruction.

During the encoding process, the video encoder 20 receives a video frame or slice to be coded. The motion estimation module 42 and the motion compensation module 44 perform inter-predictive coding of the received video block relative to one or more blocks in one or more reference frames to provide temporal compression. The intra-prediction module 46 may perform intra-predictive coding of the received video block relative to one or more neighboring blocks in the same frame or slice as the block to be coded to provide spatial compression.

As described above, for video coding according to HEVC, a frame or slice may be divided into multiple video blocks (i.e., LCUs, CUs, TUs, and PUs,). An LCU may be associated with a quadtree data structure. In general, a quadtree data structure includes one node per CU, where a root node corresponds to the LCU. If a CU is split into four sub-CUs, the node corresponding to the CU includes four leaf nodes, each of which may correspond to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs although there is no explicit splitting of the original leaf-CU. For example, if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

The mode select module 40 may select one of the coding modes, intra or inter, e.g., based on a rate distortion analysis for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform module 60 for the block to reconstruct the encoded block, as described in greater detail below. Some video frames may be designated as I-frames, where all blocks in an I-frame are encoded in an intra-prediction mode. In some cases, the intra-prediction module 46 may perform intra-prediction encoding of a block in a P- or B-frame, e.g., when motion search performed by the motion estimation module 42 does not result in a sufficient prediction of the block.

The motion estimation module 42 and the motion compensation module 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation module 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation module 42 sends the calculated motion vector to the entropy encoding module 56 and the motion compensation module 44. The portion of the reference frame identified by a motion vector may be referred to as a reference sample. The motion compensation module 44 may calculate a prediction value for a prediction unit of a current CU, e.g., by retrieving the reference sample identified by a motion vector for the PU.

The intra-prediction module 46 may intra-predict the received block, as an alternative to inter-prediction performed by the motion estimation module 42 and the motion compensation module 44. The intra-prediction module 46 may predict the received block relative to neighboring, previously coded blocks, e.g., blocks above, above and to the right, above and to the left, or to the left of the current block, assuming a left-to-right, top-to-bottom encoding order for blocks. The intra-prediction module 46 may be configured with a variety of different intra-prediction modes. For example, the intra-prediction module 46 may be configured with a certain number of directional prediction modes, e.g., thirty-five directional prediction modes, based on the size of the CU being encoded.

The intra-prediction module 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction module 46 may calculate an error value for the prediction mode based on pixel differences between the PU and the received block to be encoded. The intra-prediction module 46 may continue testing intra-prediction modes until an intra-prediction mode that yields an acceptable error value is discovered. The intra-prediction module 46 may then send the PU to the summer 50.

The video encoder 20 forms a residual block by subtracting the prediction data calculated by the motion compensation module 44 or the intra-prediction module 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform module 52 may form one or more transform units (TUs) from the residual block. The transform module 52 selects a transform from among a plurality of transforms. The transform may be selected based on one or more coding characteristics, such as block size, coding mode, or the like. The transform module 52 then applies the selected transform to the TU, producing a video block comprising a two-dimensional array of transform coefficients. The transform module 52 may select the transform partition according to above-described techniques of this disclosure. In addition, the transform module 52 may signal the selected transform partition in the encoded video bitstream.

The transform module 52 may send the resulting transform coefficients to the quantization module 54. The quantization module 54 may then quantize the transform coefficients. The entropy encoding module 56 may then perform a scan of the quantized transform coefficients in the matrix according to a scanning mode. This disclosure describes the entropy encoding module 56 as performing the scan. However, it should be understood that, in other examples, other processing modules, such as the quantization module 54, could perform the scan. Once the transform coefficients are scanned into the one-dimensional array, the entropy encoding module 56 may apply entropy coding such as CAVLC, CABAC, syntax-based context-adaptive binary arithmetic coding (SBAC), or another entropy coding methodology to the coefficients.

To perform CAVLC, the entropy encoding module 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted. To perform CABAC, the entropy encoding module 56 may select a context model to apply to a certain context to encode symbols to be transmitted. The context may relate to, for example, whether neighboring values are non-zero or not. The entropy encoding module 56 may also entropy encode syntax elements, such as the signal representative of the selected transform and filter syntax elements, described in greater detail below. In accordance with the techniques of this disclosure, the entropy encoding module 56 may select the context model used to encode these syntax elements based on, for example, an intra-prediction direction for intra-prediction modes, a scan position of the coefficient corresponding to the syntax elements, block type, and/or transform type, among other factors used for context model selection. Following the entropy coding by the entropy encoding module 56, the resulting encoded video may be transmitted to another device, such as the video decoder 30, or archived for later transmission or retrieval.

In some cases, the entropy encoding module 56 or another module of the video encoder 20 may be configured to perform other coding functions, in addition to entropy coding. For example, the entropy encoding module 56 may be configured to determine coded block pattern (CBP) values for CU's and PU's. Also, in some cases, the entropy encoding module 56 may perform run length coding of coefficients.

The inverse quantization module 58 and the inverse transform module 60 apply inverse quantization and inverse transformation, respectively, to reconstruct the residual block in the pixel domain, e.g., for later use as a reference block. The motion compensation module 44 may calculate a reference block by adding the residual block to a predictive block of one of the frames of the reference frame buffer 64. The motion compensation module 44 may also apply one or more interpolation filters to the reconstructed residual block to calculate sub-integer pixel values for use in motion estimation. The summer 62 adds the reconstructed residual block to the motion compensated prediction block produced by the motion compensation module 44 to produce a reconstructed video block.

Deblocking module 43 may receive a plurality of reconstructed video blocks forming a slice or a frame of reconstructed video and filter block boundaries to remove blockiness artifacts from a slice or frame. In one example, deblocking module 43 evaluates the so-called "boundary strength" of a video block. Based on the boundary strength of a video block, edge pixels of a video block may be filtered with respect to edge pixels of an adjacent video block such that the transition from one video block are more difficult for a viewer to perceive. It should be noted that the variables used by a deblocking filter typically can be derived from reconstructed video blocks without a comparison of reconstructed video blocks to the original source video blocks. Thus, video encoder 20 and video decoder 30 may each be programmed to perform the same deblocking process on reconstructed video blocks with minimal additional information regarding the original video frame coded into the bitstream. However, it should be noted that in some cases video encoder 20 may include syntax elements in the bitstream to indicate whether deblocking should be performed and/or whether one of a particular type of deblocking modes should be performed.

SAO/ALF module 45 receives reconstructed video blocks from deblocking module 43 and may apply SAO and other filtering techniques to the reconstructed video blocks. Filtered reconstructed video blocks may then be stored in the reference frame buffer 64. The reconstructed video block may be used by the motion estimation module 42 and the motion compensation module 44 as a reference block to inter-code a block in a subsequent video frame. As described above, SAO coding techniques may add offset values to pixels in a reconstructed video frame where the offset values are calculated based on the source video frame. Further, other filtering techniques may include an ALF process and/or Weiner filtering techniques that calculate AC and DC coefficients based on the difference between a source video frame and a reconstructed video frame. Thus, as illustrated in FIG. 7, in addition to outputting SAO/ALF adjusted video blocks to reference frame buffer 64, SAO/ALF module 45 outputs filter syntax elements to entropy encoding module 56 for later use by a video decoder. In addition to including information regarding which filtering processes should be performed, in one example, filter syntax elements may include a set of offset values and filter coefficients. In other examples, filter syntax elements may include information such that a video decoder may determine a set of offset and/or coefficient values.

In one example, SAO/ALF module 45 may be configured to perform any combination of the following filtering techniques:

(1) An ALF technique with block adaptivity. The ALF technique may be an ALF technique that has been described in proposals for HEVC. Block adaptivity may include the block and/or region adaptation modes described above with respect to FIG. 4 and FIG. 5.

(2) An ALF technique without block adaptivity. The ALF technique may be an ALF technique that has been described in proposals for HEVC. When an ALF technique does not include block adaptivity, a single filter may be used for a partition of video data.

(3) An SAO filtering technique. An SAO filtering technique may include a band offset classification technique or an edge offset technique utilizing any combination of the edge offset classifications illustrated in FIG. 1 and FIG. 2.

(4) A filtering technique that includes a combination of an ALF technique with block adaptivity and an SAO filtering technique. An example combination of an ALF technique with block adaptivity and an SAO filtering technique is described in greater detail below with respect to FIG. 9.

(5) A filtering technique that includes a combination of an ALF technique without block adaptivity and an SAO filtering technique.

(6) A filtering technique where no filtering or offsets are applied.

Figure 8A:
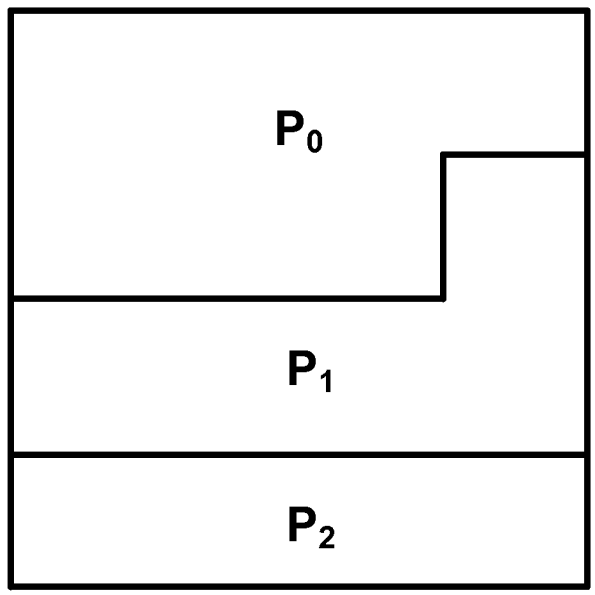
FIGS. 8A-8B are conceptual diagrams illustrating examples of a partitioned picture or video frame.
Figure 8B:
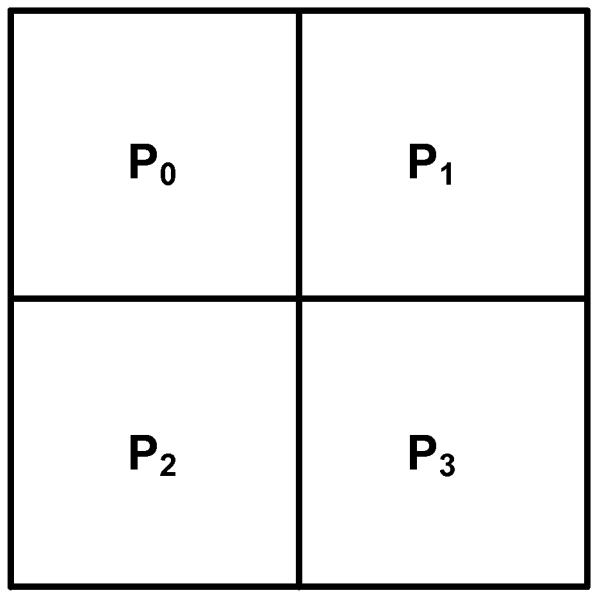

Video encoder 20 may be configured to divide a video frame into several partitions and a filtering technique may be selected for each partition. FIGS. 8A-8B illustrate an example of a video frame divided into partition for purposes of assigning a filtering technique to a partition. FIG. 8A illustrates an example where a frame is divided into partitions ($P_0$-$P_2$) of different sizes. FIG. 8B illustrates an example where a frame is divided into partitions ($P_0$-$P_3$) of different sizes. In one example, partitions ($P_0$-$P_2$) and ($P_0$-$P_3$) of a video frame may correspond to an integer number of slices of video data or CUs. In one example, each of the partitions in FIGS. 8A and 8B may be assigned one of the six filtering techniques described above. For example, $P_0$ may be filtered according to an SAO technique, $P_1$ may not be filtered and $P_3$ may be filtered using a filtering technique that is a combination of an ALF filtering technique with block adaptivity and an SAO filtering techniques.

Figure 9:
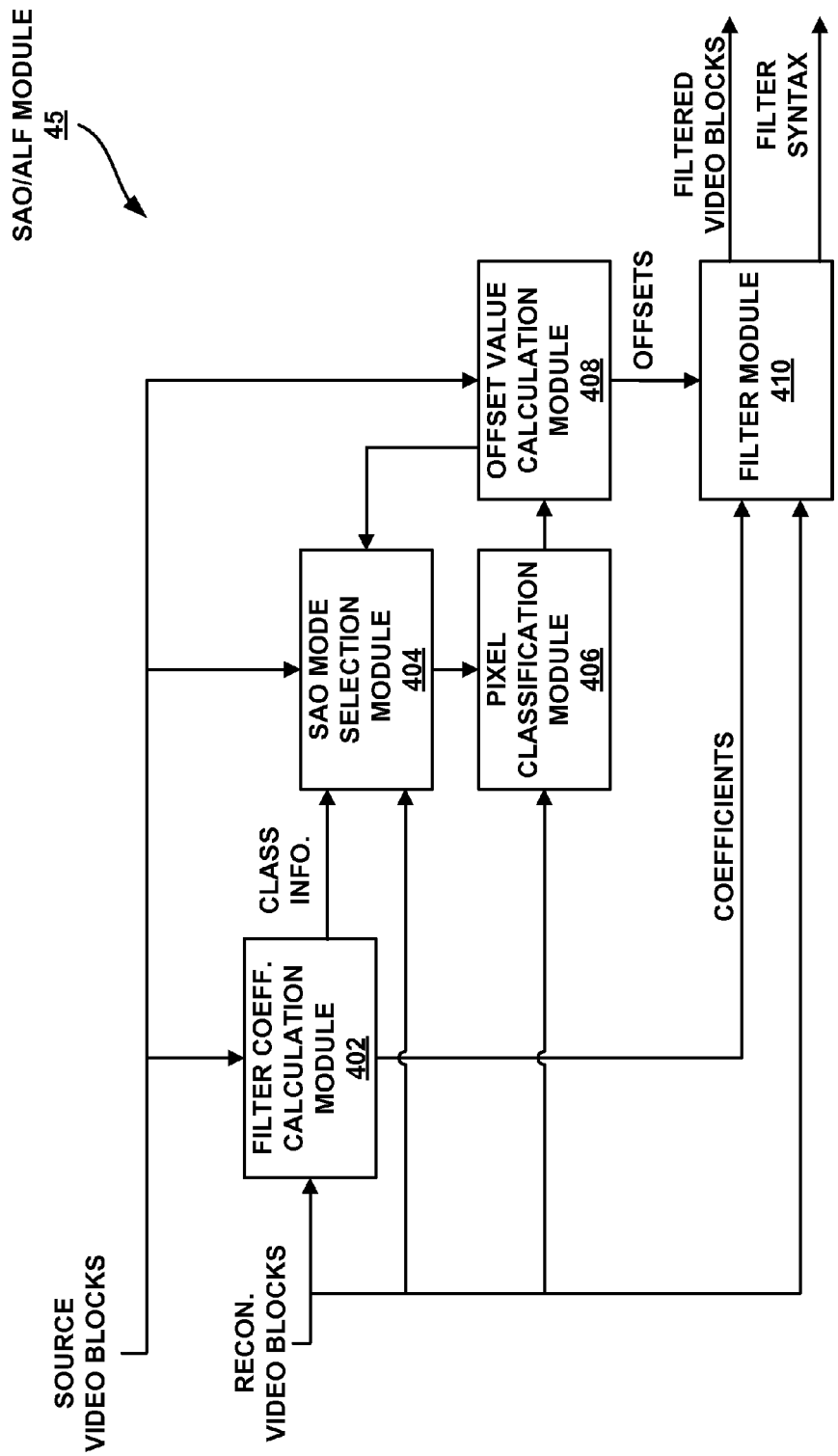
FIG. 9 is a block diagram illustrating an example SAO/ALF module included in a video encoder.

FIG. 9 is a block diagram illustrating an example SAO/ALF module that may be included in a video encoder. SAO/ALF module 45 illustrates an example of an SAO/ALF module that may be configured to merge SAO filtering techniques with filtering techniques that utilize AC and DC coefficients. Examples of SAO filter techniques are described above with respect to FIG. 1 and FIG. 2. Examples of filtering techniques that utilize AC and DC coefficients include region and block based filtering techniques described above with respect to FIG. 4 and FIG. 5. In the proposed ALF techniques for HEVC, there is a CU level ALF on/off map. That is, the ALF may be selectively applied for each CU. SAO/ALF module 45 may be configured such that SAO signaling can be synchronized with the CU level on/off map of ALF in techniques where ALF and SAO are combined. That is, the combined filtering technique may be selectively applied for each CU.

As illustrated in FIG. 9, SAO/ALF module 45 includes filter coefficient calculation module 402, SAO mode select module 404, pixel classification module 406, offset value classification module 408, and video block filter module 410. Filter coefficient calculation module 404 is configured to receive source video blocks and reconstructed video blocks and calculate a filter coefficient to be used for filtering a reconstructed video block. Filter coefficients may be calculated for a block of video data using the region-based or block-based techniques described above with respect to FIG. 4 and FIG. 5. As described above, both techniques may include determining one or more coefficients based on a classification. Filter coefficient calculation module 404 may be configured to classify a block of video data using either a region-based classification as described above with respect to FIG. 4 or classify a block of video data using a block-based technique described above with respect to FIG. 5. For example, filter coefficient calculation module 404 may derive a class for a 4×4 block by computing direction and activity information, according to the equations provided above.

Filter coefficient calculation module 404 may be configured to determine AC and/or DC filter coefficients based on a determined classification. In one example, filter coefficient calculation module 402 may be configured to calculate AC and/or DC filter coefficients based on the difference between a source video frame and a reconstructed video frame. In another example, AC and/or DC filter coefficients may be pre-calculated and filter coefficient calculation module 402 may be configured to look-up filter coefficients based on a classification associated with a region or a block. As illustrated in FIG. 9, filter coefficient calculation module 402 outputs the classification information to SAO mode selection module 404 and outputs filter coefficients to video block filter module 410.

Further, in one example, when a block-based classification is used, each class may be identified as class_i, where i=0, . . . , L−1 and L is the number of classes. In one example, one filter, which may be identified as f_i(m), where m=0, . . . , M, may be assigned to each class, where f_i(M) provides a AC and DC coefficient for a class. In a similar manner, in one example when region-based classification is used, each class may be identified as region_i, where i=0, . . . , P−1 and P is the number of regions of a frame and one filter which may be identified as f_i(m), where m=0, . . . , M, may be assigned to each class, where f_i(M) provides a AC and DC coefficient for a class or region.

However, as described above, because the SAO process adds an offset value to pixels, in some cases, DC coefficients may be redundant. Thus, in an alternative example, f_i(M) may be modified such it does not provide a DC coefficient, and instead, multiple offsets may be calculated for a block or region using the offset classification methods described above (i.e., edge offset 0/1/2/3 or band offset 0/1). For example, for a 4×4 block, one AC filter coefficient may be determined for the block using activity and direction metrics and a SAO offset value may be determined for each of the 16 pixels uses an edge offset classification. In this manner, ALF filtering techniques and SAO filtering techniques may be combined. Thus, filter coefficient calculation module 402 may be configured to calculate only AC coefficients for a block or region and/or (e.g., when SAO is combined with ALF), an AC and DC coefficients for a block or a region (e.g., when ALF is performed alone).

SAO mode selection module 404 may be configured to receive class information, source video blocks, and reconstructed video blocks and select between various SAO techniques for a partition of video blocks. In one example, SAO mode selection module 404 is configured to select between not applying an SAO filter, applying a 1D 0-degree edge filter, applying a 1D 90-degree edge filter, applying a 1D 135-degree edge filter, applying a 1D 45-degree edge filter, applying either of the SAO filters illustrated in FIG. 2, applying a central band filter or applying a side band filter. In one example, SAO mode selection module 404 may be configured to select a mode based on properties of a source video frame, properties of a reconstructed video frame, a reconstruction error, and/or differences between a source video block and a reconstructed video block. In other examples, mode selection module 404 may be configured to select an SAO technique based on an iterative process where a plurality of SAO techniques are performed and SAO mode selection module 404 selects an SAO techniques based on a rate distortion analysis.

Further, in one example, SAO mode selection module 404 may be configured to select an SAO mode based on a block-based or region-based classification of ALF. In this manner, ALF and SAO filtering techniques may be additionally combined. For example, in the block-based classification technique described above with respect to FIG. 5, each of class (i.e., 0, 1, . . . , 14, 15) is based on an activity and direction calculation associated with a block. The activity and direction calculations may provide an indication of which of the edge offset techniques may provide more optimum filtering results. In one example, SAO mode selection module 404 may be configured to prioritize the possible offset classification methods (i.e., increase the probability that a particular offset mode is selected) or limit the number of possible offset classification methods for a block based on a class associated with a block.

For example, classes 5, 6, . . . , 9 indicate strong horizontal direction activity. Thus, SAO mode selection module 404 may be configured to prioritize the selection of edge offset 0, which uses horizontal direction pixels, when the class is equal to any of 5, 6, . . . , 9. In addition or as an alternative to prioritizing the selection of edge offset 0 when the class is equal to any of 5, 6, . . . , 9, SAO mode selection module 404 may further be configured to eliminate edge offset 1, which uses vertical direction pixels, when the class is equal to any of 5, 6, . . . , 9. Further, classes 10, 11, . . . , 14 indicate strong vertical direction activity. Thus, SAO mode selection module 404 may be configured to prioritize the selection of edge offset 1, which uses vertical direction pixels, and/or eliminate edge offset 0, when the class is equal to any of 10, 11, . . . , 14.

Further, it should be noted that SAO mode selection module 404 may be configured such that each region of a video frame in region-based classification may have more than one offset classification mode by using a block-based classification within a region. For example, for region_0, an edge offset$_0$ may be applied for all 4×4 blocks within the region having a of class_5 through class_9 and edge offset$_1$ may be applied for all 4×4 blocks within the region having a class of class_10 through class_14.

Further, SAO/ALF mode selection module 404 may also be configured to skip performing SAO filtering for 4×4 blocks with a specific class_i even though ALF is applied on for those blocks. For example, for 4×4 blocks with class_0, SAO can be skipped because class_0 means that there are minor directional and laplacian activities on those blocks. In this manner, the region-based and block-based classification techniques may be combined.

Pixel classification module 406 may be configured to receive an indication of an SAO technique from SAO mode selection module 404 and classify pixels accordingly. For example, if the indicated SAO technique is SAO_EO_4, as described with respect to FIG. 2 above, pixel classification module 406 may calculate an edge type of either −2, −1, 0, 1, or 2 for each of the pixels within a block or region pixels based on the values of pixels identified as 1 and 2 in FIG. 2. When one of pixels identified as 1 or 2 is unavailable for calculating an edge type of a current pixel, pixel classification module 406 may assign a default edge type value (e.g., edge type 0) to a current pixel. Further, pixel classification module 406 may be configured to classify a pixel into a band, when a band offset is selected.

Offset value calculation module 408 may be configured to receive a set of edge type values or a band classification for a partition of video data and determine a set of corresponding offset values. As described above, offset values may be based on the difference between the original video frame and the reconstructed video frame. Further, as described above, in the case of edge classification, in one example SAO technique, each non-zero edge type value (i.e., −2, −1, 1, and 2) may have one offset value (i.e., eoffset$_{-2}$, eoffset$_{-1}$, eoffset$_1$, and eoffset$_2$). However, in one other example, offset value calculation module 408 may also be configured to determine an edge offset value when EdgeType=0. Thus, offset value calculation module 408 may determine one offset value (i.e., eoffset$_{-2}$, eoffset$_{-1}$, eoffset$_0$, eoffset$_1$, eoffset$_2$) for each edge type value (i.e., −2, −1, 0, 1, and 2). Further, offset value calculation module 408 may be configured to determine an edge offset value for EdgeType=0 based on whether the SAO filtering technique is merged with ALF. For example, offset value calculation module 408 may be configured to calculate an edge offset value for EdgeType=0, based on whether filtering coefficient calculation module 402 calculates a DC coefficient.

Further, offset value calculation module 408 may be configured to generate offset value syntax that may be used by a video decoder to reconstruct offset values. Further, offset value calculation module 408 may output offset values to mode select module 404, as part of an iterative mode selection process. In one example, offset value calculation module 408 may generate offset value syntax that indicates an SAO mode and corresponding offset values, where each of the corresponding offset values is represented using with a binary string (e.g., five binary values for five offset values). Further, in one example, offset value calculation module 406 may reduce number of bits required to send a group of offset values by taking advantage of correlations between offset values within a group. Thus, instead of representing each offset value individually, offset value calculation module 406 may output syntax elements that allow a video decoder to determine/predict a group of offset values.

In one example, offset value calculation module 406 may be configured to signal the five edge offset values described above (i.e., eoffset$_{-2}$, eoffset$_{-1}$, eoffset$_0$, eoffset$_1$, eoffset$_2$) in one of two ways: independently or using a predictive technique. A predictive technique may include modifying one or more offset values within a set of offset values using a known operation, such that a video decoder can generate the set of offset values by performing a reciprocal operation. Predictive techniques may be particularly useful when edge offset values are coded using a truncated unary coding technique. In one example, one of the offset values may be subtracted another offset value and one of the offset values and the result of the subtraction may be signaled in a bitstream. In this case, a video decoder may determine the offset values by added the result to the known offset value. In one example, eoffset$_0$ may be subtracted from the other offset values within a set of edge offset values. In this example, offset value calculation module may be configured to include the following values in an encoded bitstream: eoffset$_{-2}$-eoffset$_0$; eoffset$_{-1}$-eoffset$_0$; eoffset$_0$; eoffset$_1$-eoffset$_0$; and eoffset$_2$-eoffset$_0$.

In one example, offset value calculation module 406 may be further configured to signal the 16 band offset values described above (i.e., boffset$_0$, . . . , boffset$_{15}$) independently or using a predictive technique. In one example, a predictive technique may include calculation the mean of the boffset$_0$, . . . , boffset$_{15}$ from each of boffset$_0$, . . . , boffset$_{15}$ and including the following values in an encoded bitstream: M_b=Mean (boffset$_0$, . . . , boffset$_{15}$); boffset$_0$-M_b; boffset$_{15}$-M_b; . . . ; boffset$_{15}$-M_b. It should be noted that predictive techniques may be used in conjunction with either the region-based and block-based classification techniques described above.

Filter module 410 may be configured to receive reconstructed video blocks, offset values, and filter coefficients and outputs filtered video blocks and filter coefficient syntax. Filter module 410 may be configured to perform filtering techniques using filtering coefficients, such as Weiner filtering techniques or ALF techniques described in proposals to HEVC. Further, filter module 410 may be configured to add offset values to reconstructed video blocks. Filter module 410 may be configured to apply a filtering technique to a region or block of video data using a single set of coefficients for each pixel within the region or block and add a respective offset value to each pixel with the region or block. As describe above, offset values may be determined based on a classification associated with a region or block of video data.

In this manner, video encoder 20, SAO/ALF module 45, filter coefficient calculation module 402, SAO mode selection module 404, pixel classification module 406, offset value calculation module 408 and/or filter module 410 may be configured to receive a block of video data, wherein the block of video data includes a plurality of sample values, determine one or more filter coefficients for the block of video data, determine a respective offset value for each of the plurality of sample values based at least in part on the one or more filter coefficients, and filter the block of video data based on the determined one or more filter coefficient and the determined respective offset values.

Figure 10:
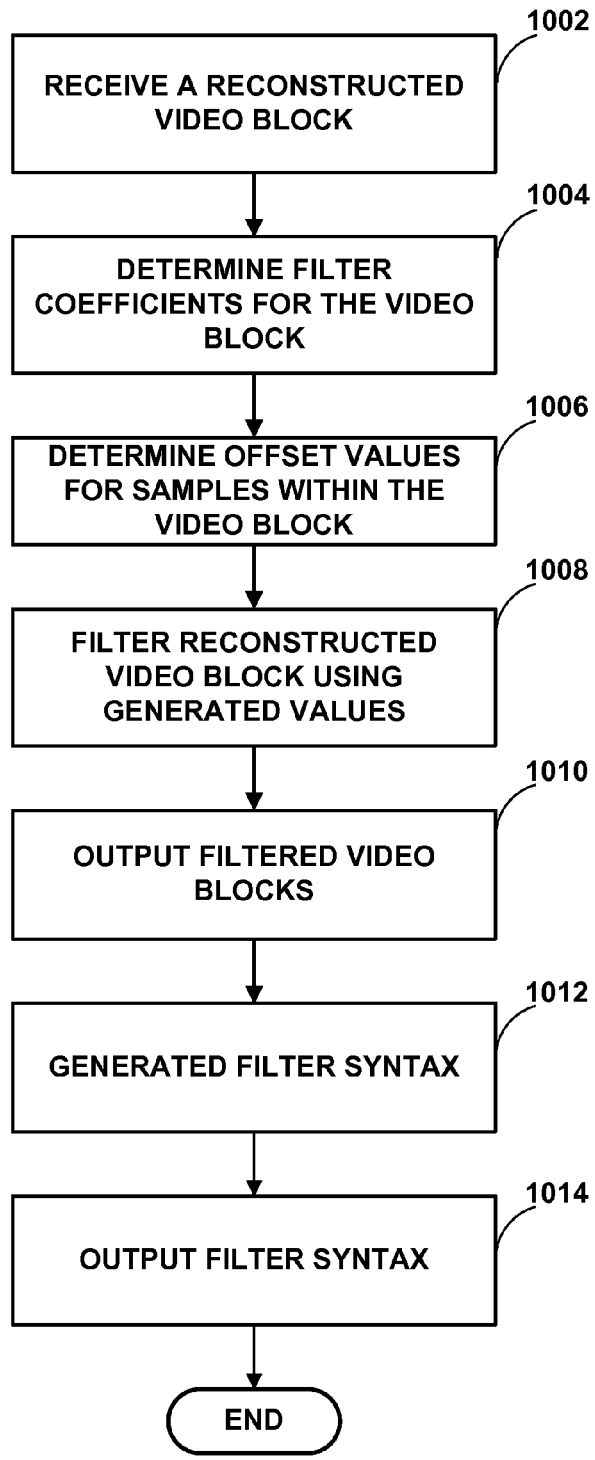
FIG. 10 is a flowchart illustrating an example of filtering video data according to the techniques of this disclosure.

FIG. 10 is a flowchart illustrating an example of applying filtering techniques and encoding filter syntax according to the techniques of this disclosure. Although the process in FIG. 10 is described below with respect to video SAO/ALF module 45, the process may be performed by any combination of video encoder 20, SAO/ALF module 45, filter coefficient calculation module 402, SAO mode selection module 404, pixel classification module 406, offset value calculation module 408 and/or filter module 410.

As illustrated in FIG. 10, SAO/ALF module 45 receives a reconstructed video block (1002). Reconstructed video blocks may be generated according to a predictive technique. In some cases, a deblocking filter may be applied to reconstructed video blocks before they are received by SAO/ALF module 45. SAO/ALF module 45 determines filter coefficients for the video block (1004). Filter coefficients may include AC coefficients, DC coefficients or AC and DC coefficients. Filter coefficients may correspond to Weiner filters and ALF filter processes be generated according to the techniques described above. SAO/ALF module 45 determines offset values for samples with the video block (1006). Offset values may correspond to edge offset classifications or band offset classifications and may be determined using the techniques described above. SAO/ALF module 45 filters the reconstructed video block using the generated filter coefficients and offset values (1008). Filtering the reconstructed video blocks may include adding SAO offsets to pixel values in reconstructed video blocks and/or multiplying all of the pixels values within the video block by a set of filter coefficients. SAO/ALF module 45 outputs filtered reconstructed video blocks (1010). Filtered reconstructed video blocks may be output to a reference frame buffer to be used for subsequent predictions. SAO/ALF module 45 generates filter syntax (1012). Filter syntax may include any of the syntax elements described above and may further include any syntax elements that allow a video decoder to determine a filtering technique and filter values associated with the filter technique. SAO/ALF module 45 outputs the generated filter syntax (1014). SAO/ALF module 45 may out filter syntax to an entropy encoder, such as entropy encoder 56 described above.

Figure 11:
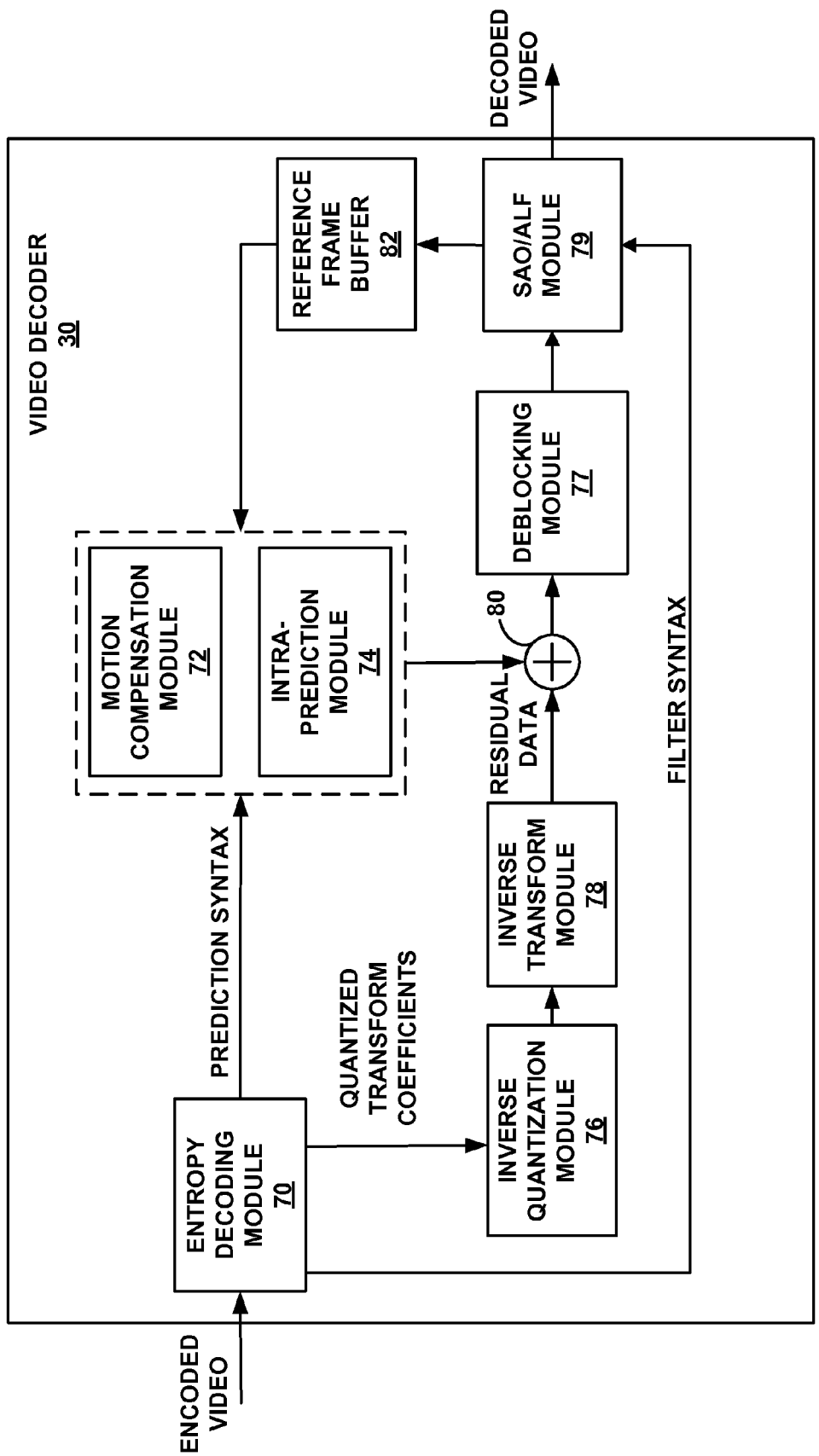
FIG. 11 is a block diagram illustrating an example video decoder.

FIG. 11 is a block diagram illustrating an example of a video decoder 30, which decodes an encoded video sequence. In the example of FIG. 11, the video decoder 30 includes an entropy decoding module 70, a motion compensation module 72, an intra-prediction module 74, an inverse quantization module 76, a deblocking module 77, an inverse transformation module 78, a reference frame buffer 82, a SAO and ALF module 79, and a summer 80. The video decoder 30 may, in some examples, perform a decoding pass generally reciprocal to the encoding pass described with respect to the video encoder 20 (see FIG. 7).

The entropy decoding module 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding module 70 (or the inverse quantization module 76) may scan the received values using a scan mirroring the scanning mode used by the entropy encoding module 56 (or the quantization module 54) of the video encoder 20. Although the scanning of coefficients may be performed in the inverse quantization module 76, scanning will be described for purposes of illustration as being performed by the entropy decoding module 70. In addition, although shown as separate functional modules for ease of illustration, the structure and functionality of the entropy decoding module 70, the inverse quantization module 76, and other modules of the video decoder 30 may be highly integrated with one another. Further, entropy decoding module 70 may entropy decode syntax elements, such as filter syntax element described above.

The inverse quantization module 76 inverse quantizes, i.e., de-quantizes, the quantized transform coefficients provided in the bitstream and decoded by the entropy decoding module 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization module 76 may inverse quantize the transform coefficients either before or after the coefficients are converted from a one-dimensional array to a two-dimensional array.

The inverse transform module 78 applies an inverse transform to the inverse quantized transform coefficients. In some examples, the inverse transform module 78 may determine an inverse transform based on signaling from the video encoder 20, or by inferring the transform from one or more coding characteristics such as block size, coding mode, or the like. In some examples, the inverse transform module 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform module 78 may apply a cascaded inverse transform, in which inverse transform module 78 applies two or more inverse transforms to the transform coefficients of the current block being decoded.

The intra-prediction module 74 may generate prediction data for a current block of a current frame based on a signaled intra-prediction mode and data from previously decoded blocks of the current frame. Based on the retrieved motion prediction direction, reference frame index, and calculated current motion vector, the motion compensation module 72 produces a motion compensated block for the current portion. These motion compensated blocks essentially recreate the predictive block used to produce the residual data. The motion compensation module 72 may produce the motion compensated blocks, possibly performing interpolation based on interpolation filters. Identifiers for interpolation filters to be used for motion estimation with sub-pixel precision may be included in the syntax elements. The motion compensation module 72 may use interpolation filters as used by the video encoder 20 during encoding of the video block to calculate interpolated values for sub-integer pixels of a reference block. The motion compensation module 72 may determine the interpolation filters used by the video encoder 20 according to received syntax information and use the interpolation filters to produce predictive blocks.

Additionally, the motion compensation module 72 and the intra-prediction module 74, in an HEVC example, may use some of the syntax information (e.g., provided by a quadtree) to determine sizes of LCUs used to encode frame(s) of the encoded video sequence. The motion compensation module 72 and the intra-prediction module 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence. The summer 80 combines the residual blocks with the corresponding prediction blocks generated by the motion compensation module 72 or the intra-prediction module 74 to form decoded blocks.

Deblocking module 77 may receive a plurality of reconstructed video blocks forming a slice or a frame of reconstructed video and filter block boundaries to remove blockiness artifacts from a slice or frame. Deblocking module 77 may operate in a similar manner to deblocking module 43 described above. In one example, deblocking module 77 evaluates the so-called "boundary strength" of a video block. Based on the boundary strength of a video block, edge pixels of a video block may be filtered with respect to edge pixels of an adjacent video block.

The SAO/ALF module 79 receives filter syntax and reconstructed video blocks and outputs filtered reconstructed video blocks. The SAO/ALF module 79 operates in accordance with the filter techniques described above with respective to FIG. 9 for example. SAO/ALF module 79 may output the filtered video blocks to reference frame buffer 82 and/or to a display (such as the display device 32 of FIG. 6). When filtered video blocks are stored in the reference frame buffer 82, they may be used as reference blocks for subsequent motion compensation.

Figure 12:
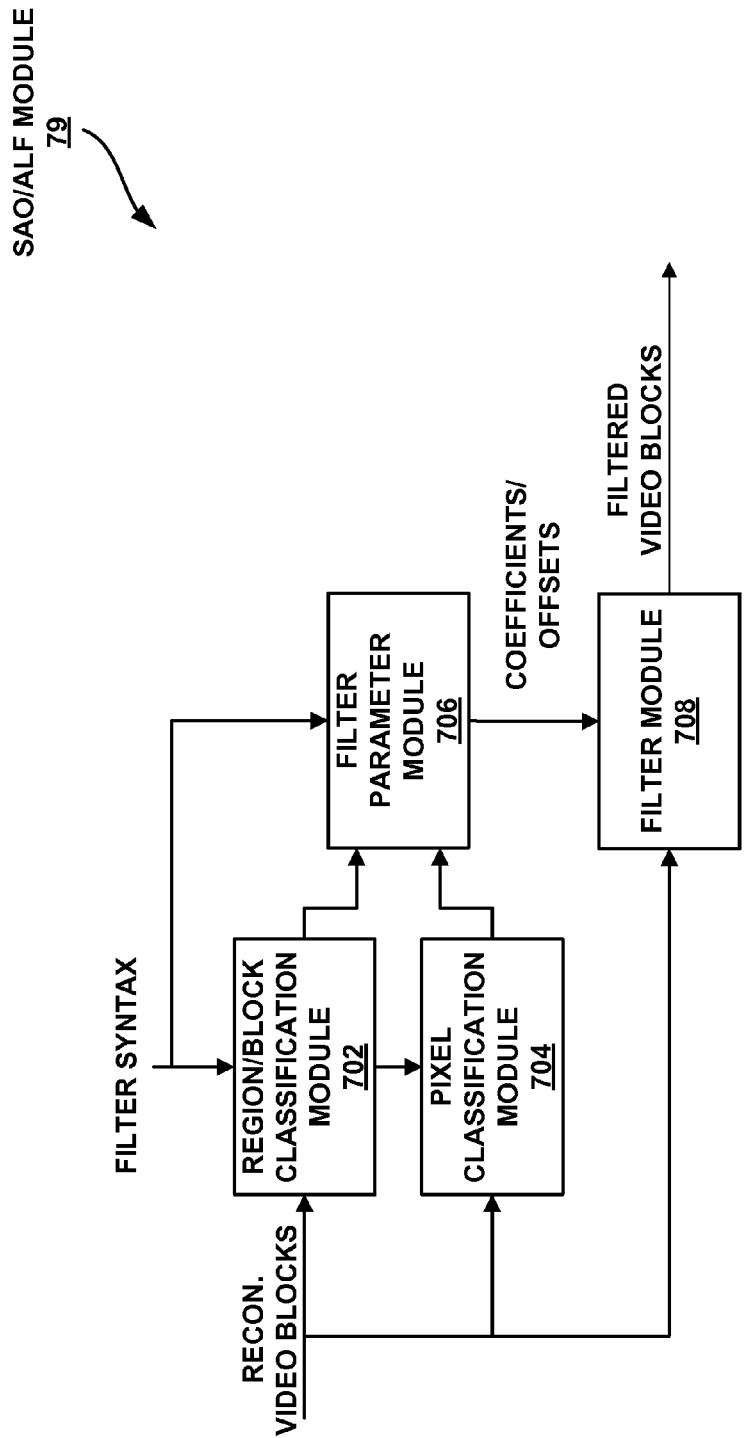
FIG. 12 is a block diagram illustrating an example SAO/ALF module included in a video decoder.

FIG. 12 is a block diagram illustrating an example SAO/ALF module included in a video decoder. SAO/ALF module 79 receives reconstructed video blocks and filter syntax (e.g., mode syntax, offset values, and filter coefficients) as inputs and outputs filtered video blocks. SAO/ALF module 79 may generate filtered video blocks by using SAO filtering techniques alone, using other filtering techniques, such as Weiner filtering techniques or the ALF process described in proposals for HEVC, alone, or by using SAO filtering techniques and other filtering techniques in combination as described above. In most cases, SAO/ALF module 79 will perform filtering consistent with a filter process performed by a video encoder. Thus, SAO/ALF module 79 may be configured such that it can perform any of the example filter techniques described above with respect SAO/ALF module 45. For the sake of brevity a detailed description of filtering techniques described with respect to SAO/ALF module 45 will not be repeated. However, it should be noted that SAO/ALF 45 may reference an original video frame when determining a filtering mode and performing a filtering process, whereas SAO/ALF module 79 relies on information including in an encoded bitstream. The example SAO/ALF module 79 illustrated in FIG. 12 includes region/block classification module 702, pixel classification module 704, filter parameter module 706, and filter module 708.

In one example, region/block classification module 702 may be configured to receive a partition of a video frame and an indication of a classification (e.g., block-based classification or region-based classification) and classify a partition based on values associated with a partition. For example, region/block classification module 704 may classify pixels based on the techniques described above with respect to FIGS. 4 and 5. For example, region/block classification module 702 may receive a 4×4 video block and classify the block as one of classes 0 through 15 using the direction and activity computations described above. It should be noted that in some cases, the classification values may be included in filter syntax.

In one example, pixel classification module 704 may be configured to receive an indication of an SAO technique from filter syntax and classify pixels based on the pixel values of a reconstructed video block. In one example, pixel classification module 704 may classify pixels based on the techniques described above with respect to FIGS. 1-3 above. Further, as described above, pixel classifications may be determined based on a classification associated with a region or block of video data. Thus, in some cases, pixel classification module 704 may receive a block-based classification and determine an SAO technique based on the classification. It should be noted that in some cases, the pixel classification values may be included in the filter syntax.

Filter parameter module 706 may be configured to receive a set of offset type values for a partition and classifications and determine corresponding filter coefficients and offset values and filter coefficients. Filter parameter module 706 may be configured to determine AC and/or DC filter coefficients based on a determined classification. In another example, AC and/or DC filter coefficients may be included in filter syntax in an encoded bitstream. Further, filter coefficients may be pre-calculated and filter coefficient calculation module 706 may be configured to look-up filter coefficients based on a classification associated with a region or a block.

Further, as described in the examples above with respect to FIG. 9, offset value syntax may be based on signaling techniques that signal each offset value explicitly or techniques that utilize correlations between offset values. Filter parameter module 706 may be configured to determine offset values by performing the reciprocal coding process to any of the coding processes described above.

Filter module 708 may be configured to receive reconstructed video blocks, offset values, filter coefficients, offset values and output filtered video blocks. Filter module 708 may be configured to perform filtering techniques using filtering coefficients, such as Weiner filtering techniques or ALF techniques described in proposals for HEVC. Further, filter module 708 may be configured to add offset values to reconstructed video blocks. Filter module 708 may be configured to apply a filtering technique to a region or block of video data using a single set of coefficients for the block or region and add a respective offset value to each pixel with the region or block.

In this manner, video decoder 30, SAO/ALF module 79, region/block classification module 702, pixel classification module 704, filter parameter module 706, and/or filter module 708 may be configured to receive a block of video data, wherein the block of video data includes a plurality of sample values, determine one or more filter coefficients for the block of video data, determine a respective offset value for each of the plurality of sample values based at least in part on the one or more filter coefficients, and filter the block of video data based on the determined one or more filter coefficient and the determined respective offset values.

Figure 13:
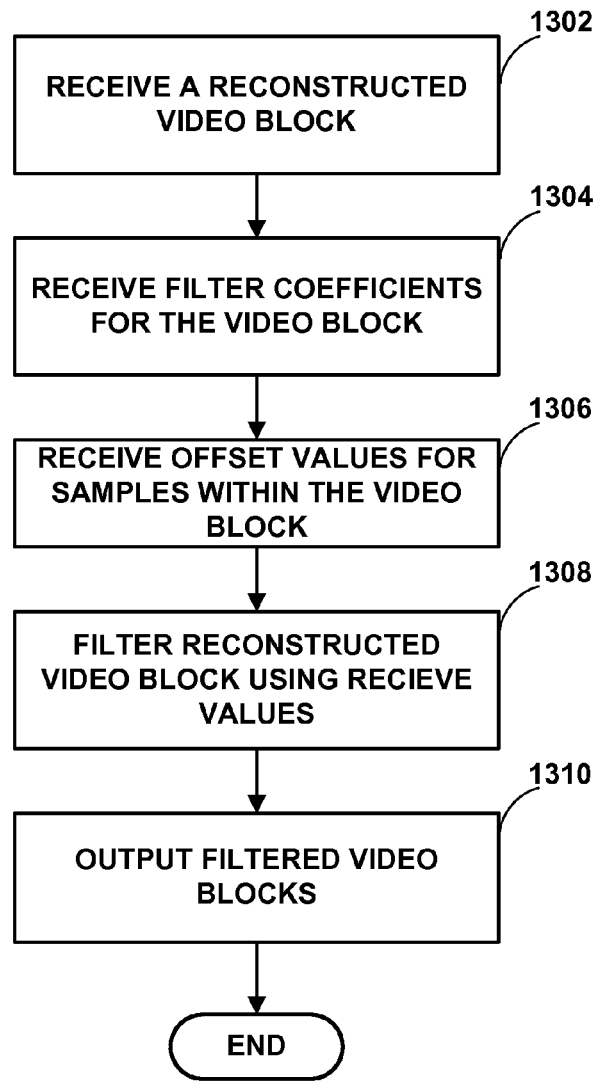
FIG. 13 is a flowchart illustrating an example of filtering video data according to the techniques of this disclosure.

FIG. 13 is a flowchart illustrating an example of applying filtering techniques according to the techniques of this disclosure. Although the process in FIG. 13 is described below with respect to video SAO/ALF module 79, the process may be performed by any combination of video decoder 30, SAO/ALF module 79, region/block classification module 702, pixel classification module 704, filter parameter module 706, and/or filter module 708.

As illustrated in FIG. 13, SAO/ALF module 79 receives a reconstructed video block (1302). Reconstructed video blocks may be generated according to a predictive technique. In some cases, a deblocking filter may be applied to reconstructed video blocks before they are received by SAO/ALF module 79. SAO/ALF module 79 receives filter coefficients for the video block (1304). Filter coefficients may include AC coefficients, DC coefficients or AC and DC coefficients. Filter coefficients may correspond to Weiner filters and ALF filter processes be generated according to the techniques described above. SAO/ALF module 79 receives offset values for samples with the video block (1306). Offset values may correspond to edge offset classifications or band offset classifications and may be determined using the techniques described above. SAO/ALF module 45 filters the reconstructed video block using the received filter coefficients and offset values (1308). Filtering the reconstructed video blocks may include adding SAO offsets to pixel values in reconstructed video blocks and/or multiplying all of the pixels values within the video block by a set of filter coefficients. SAO/ALF module 79 outputs filtered reconstructed video blocks (1310). Filtered reconstructed video blocks may be output to a reference frame buffer to be used for subsequent predictions.

The video encoder 20 may implement any or all of the techniques of this disclosure for performing sample adaptive offset and adaptive loop filter processes in a video coding process. Likewise, the video decoder 30 may implement any or all of these techniques for performing sample adaptive offset and adaptive loop filter processes in a video coding process. A video coder, as described in this disclosure, may refer to a video encoder or a video decoder. Similarly, a video coding unit may refer to a video encoder or a video decoder. Likewise, video coding may refer to video encoding or video decoding.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering video data in a video coding process comprising:
receiving a block of video data, wherein the block of video data includes a plurality of sample values;
determining filter coefficients for the block of video data for an adaptive loop filter (ALF), wherein determining the filter coefficients for the block of video data includes determining the AC coefficients and not determining any DC coefficients;
determining a respective offset value for each of the plurality of sample values based at least in part on a value associated with the filter coefficients, wherein the respective offset values are for a sample adaptive offset (SAO) filter; and
filtering the block of video data based on the determined filter coefficients and the determined respective offset values without filtering the block of video data based on the DC coefficient for the ALF that is not determined.

2. The method of claim 1, wherein determining the respective offset value includes selecting an SAO filter mode from a set of SAO filter modes, wherein the set of SAO filter modes includes: no SAO filter applied, 1D 0-degree edge, 1D 90-degree edge, 1D 135-degree edge, 1D 45-degree edge, 1D less than 45-degree edge, 1D greater than 135 degree edge, central band filter, and side band filter.

3. The method of claim 1, wherein determining the respective offset value includes selecting an SAO filter mode from a set of SAO filter modes, wherein the set of SAO filter modes includes: 1D 0-degree edge, 1D 90-degree edge, 1D 135-degree edge, and 1D 45-degree edge.

4. The method of claim 3, wherein determining filter coefficients includes determining a directional activity for the block of video data and wherein selecting an SAO filter mode includes selecting an SAO filter mode based at least in part on the directional activity.

5. The method of claim 1, wherein determining filter coefficients includes determining a classification for the block of video data based on directional activity of the block of video data and wherein determining a respective offset value includes determining not to apply an SAO filter when the classification for the block of video data is class_0.

6. The method of claim 1, wherein filtering the block of video data based on the determined filter coefficients and the determined respective offset values includes adjusting the value of the one or more of the samples in the block of video data by using the filter coefficients as a weight value and adding the respective offset values to respective sample values.

7. The method of claim 1, wherein the block of video data is a 4×4 array of sample values block of video data.

8. The method of claim 1, wherein the block of video data is one of sixteen regions of a video frame.

9. The method of claim 1, further comprising encoding the block of video data using a predictive technique and signaling the filter coefficients and respective offset values in an encoded bitstream.

10. The method of claim 1, further comprising decoding the block of video data from an encoded bitstream and wherein determining a respective offset value for each of the plurality of sample values includes decoding the respective offset values from an encoded bitstream.

11. An apparatus configured to filter video data in a video coding process comprising:
means for receiving a block of video data, wherein the block of video data includes a plurality of sample values;
means for determining filter coefficients for the block of video data for an adaptive loop filter (ALF), wherein the means for determining the filter coefficients for the block of video data includes means for determining the AC coefficients and not determining any DC coefficients;
means for determining a respective offset value for each of the plurality of sample values based at least in part on a value associated with the filter coefficients, wherein the respective offset values are for a sample adaptive offset (SAO) filter; and
means for filtering the block of video data based on the determined filter coefficients and the determined respective offset values without filtering the block of video data based on the DC coefficient for the ALF that is not determined.

12. The apparatus of claim 11, wherein determining the respective offset value includes selecting an SAO filter mode from a set of SAO filter modes, wherein the set of SAO filter modes includes: no SAO filter applied, 1D 0-degree edge, 1D 90-degree edge, 1D 135-degree edge, 1D 45-degree edge, 1D less than 45-degree edge, 1D greater than 135 degree edge, central band filter, and side band filter.

13. The apparatus of claim 11, wherein determining the respective offset value includes selecting an SAO filter mode from a set of SAO filter modes, wherein the set of SAO filter modes includes: 1D 0-degree edge, 1D 90-degree edge, 1D 135-degree edge, and 1D 45-degree edge.

14. The apparatus of claim 13, wherein determining filter coefficients includes determining a directional activity for the block of video data and wherein selecting an SAO filter mode includes selecting an SAO filter mode based at least in part on the directional activity.

15. The apparatus of claim 11, wherein determining filter coefficients includes determining a classification for the block of video data based on directional activity of the block of video data and wherein determining a respective offset value includes determining not to apply an SAO filter when the classification for the block of video data is class_0.

16. The apparatus of claim 11, wherein filtering the block of video data based on the determined filter coefficients and the determined respective offset values includes adjusting the value of the one or more of the samples in the block of video data by using the filter coefficients as a weight value and adding the respective offset values to respective sample values.

17. The apparatus of claim 11, wherein the block of video data is a 4×4 array of sample values block of video data.

18. The apparatus of claim 11, wherein the block of video data is one of sixteen regions of a video frame.

19. The apparatus of claim 11, further comprising means for encoding the block of video data using a predictive technique and means for signaling the filter coefficients and respective offset values in an encoded bitstream.

20. The apparatus of claim 11, further comprising means for decoding the block of video data from an encoded bitstream and wherein determining a respective offset value for each of the plurality of sample values includes decoding the respective offset values from an encoded bitstream.

21. A device comprising:
a memory configured to store video data; and
a video coder configured to:
receive a block of the video data, wherein the block of the video data includes a plurality of sample values;
determine filter coefficients for the block of video data for an adaptive loop filter (ALF), wherein determining the filter coefficients for the block of video data includes determining the AC coefficients and not determining any DC coefficients;
determine a respective offset value for each of the plurality of sample values based at least in part on a value associated with the filter coefficients, wherein the respective offset values are for a sample adaptive offset (SAO) filter; and
filter the block of video data based on the determined filter coefficients and the determined respective offset values without filtering the block of video data based on the DC coefficient for the ALF that is not determined.

22. The device of claim 21, wherein, to determine a respective offset value, the video coder is configured to select an SAO filter mode from a set of SAO filter modes, wherein the set of SAO filter modes includes: no SAO filter applied, 1D 0-degree edge, 1D 90-degree edge, 1D 135-degree edge, 1D 45-degree edge, 1D less than 45-degree edge, 1D greater than 135 degree edge, central band filter, and side band filter.

23. The device of claim 21, wherein to determine a respective offset value, the video coder is configured to select an SAO filter mode from a set of SAO filter modes, wherein the set of SAO filter modes includes: 1D 0-degree edge, 1D 90-degree edge, 1D 135-degree edge, and 1D 45-degree edge.

24. The device of claim 23, wherein, to determine filter coefficients, the video coder is configured to determine a directional activity for the block of video data and wherein, to select an SAO filter mode, the video coder is configured to select an SAO filter mode based at least in part on the directional activity.

25. The device of claim 21, wherein, to determine filter coefficients, the video coder is configured to determine a classification for the block of video data based on directional activity of the block of video data and wherein, to determine a respective offset value, the video is configured to determine not to apply an SAO filter when the classification for the block of video data is class_0.

26. The device of claim 21, wherein, to filter the block of video data based on the determined one or more filter coefficients and the determined respective offset values, the video coder is configured to adjust the value of the one or more of the samples in the block of video data by using the one or more filter coefficients as a weight value and adding the respective offset values to respective sample values.

27. The device of claim 21, wherein the block of video data is a 4×4 array of sample values block of video data.

28. The device of claim 21, wherein the block of video data is one of sixteen regions of a video frame.

29. The device of claim 21, wherein the video coder comprises a video encoder and is further configured to encode the block of video data using a predictive technique and signal the filter coefficients and respective offset values in an encoded bitstream.

30. The device of claim 21, wherein the video coder comprises a video decoder, wherein the video decoder is configured to decode the block of video data from an encoded bitstream, and wherein, to determine a respective offset value for each of the plurality of sample values, the video decoder is configured to decode the respective offset values from an encoded bitstream.

31. A non-transitory computer-readable storage medium having instructions stored thereon that upon execution cause one or more processors of a video coding device to:
receive a block of video data, wherein the block of video data includes a plurality of sample values;
determine filter coefficients for the block of video data for an adaptive loop filter (ALF), wherein determining the filter coefficients for the block of video data includes determining the AC coefficients and not determining any DC coefficients;
determine a respective offset value for each of the plurality of sample values based at least in part on a value associated with the filter coefficients, wherein the respective offset values are for a sample adaptive offset (SAO) filter; and
filter the block of video data based on the determined filter coefficients and the determined respective offset values without filtering the block of video data based on the DC coefficient for the ALF that is not determined.

32. The non-transitory computer-readable storage medium of claim 31, wherein the instructions that cause the one or more processors to determine a respective offset value comprise instructions that cause the one or more processors to select an SAO filter mode from a set of SAO filter modes, wherein the set of SAO filter modes includes: no SAO filter applied, 1D 0-degree edge, 1D 90-degree edge, 1D 135-degree edge, 1D 45-degree edge, 1D less than 45-degree edge, 1D greater than 135 degree edge, central band filter, and side band filter.

33. The non-transitory computer-readable storage medium of claim 31, wherein the instructions that cause the one or more processors to determine a respective offset value comprise instructions that cause the one or more processors to select an SAO filter mode from a set of SAO filter modes, wherein the set of SAO filter modes includes: 1D 0-degree edge, 1D 90-degree edge, 1D 135-degree edge, and 1D 45-degree edge.

34. The non-transitory computer-readable storage medium of claim 33, wherein the instructions that cause the one or more processors to determine filter coefficients comprise instructions that cause the one or more processors to determine a directional activity for the block of video data and wherein selecting an SAO filter mode includes selecting an SAO filter mode based at least in part on the directional activity.

35. The non-transitory computer-readable storage medium of claim 31, wherein the instructions that cause the one or more processors to determine filter coefficients comprise instructions that cause the one or more processors to determine a classification for the block of video data based on directional activity of the block of video data, and wherein the instructions that cause the one or more processors to determine a respective offset value comprise the instructions that cause the one or more processors to determine not to apply an SAO filter when the classification for the block of video data is class_0.

36. The non-transitory computer-readable storage medium of claim 31, wherein the instructions that cause the one or more processors to filter the block of video data based on the determined filter coefficients and the determined respective offset values comprise instructions that cause the one or more processors to adjust the value of the one or more of the samples in the block of video data by using the filter coefficients as a weight value and adding the respective offset values to respective sample values.

37. The non-transitory computer-readable storage medium of claim 31, wherein the block of video data is a 4×4 array of sample values block of video data.

38. The non-transitory computer-readable storage medium of claim 31, wherein the block of video data is one of sixteen regions of a video frame.

39. The non-transitory computer-readable storage medium of claim 31, further comprising instructions that cause the one or more processors to:
   encode the block of video data using a predictive technique and signal the filter coefficients and respective offset values in an encoded bitstream.

40. The non-transitory computer-readable storage medium of claim 31, further comprising instructions that cause the one or more processors to:
   decode the block of video data from an encoded bitstream, and wherein the instructions that cause the one or more processors to determine a respective offset value for each of the plurality of sample values comprise instructions that cause the one or more processors to decode the respective offset values from an encoded bitstream.

* * * * *